US012238765B2

(12) United States Patent
Ajami et al.

(10) Patent No.: US 12,238,765 B2
(45) Date of Patent: Feb. 25, 2025

(54) TRAFFIC MANAGEMENT FOR WIRELESS STATIONS (STAs) THAT DO NOT SUPPORT RESTRICTED TARGET WAKE TIME (r-TWT) OPERATION

(71) Applicant: QUALCOMM Incorporated, San Diego, CA (US)

(72) Inventors: Abdel Karim Ajami, San Diego, CA (US); Sai Yiu Duncan Ho, San Diego, CA (US); George Cherian, San Diego, CA (US); Alfred Asterjadhi, San Diego, CA (US); Abhishek Pramod Patil, San Diego, CA (US); Yanjun Sun, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 17/480,143

(22) Filed: Sep. 21, 2021

(65) Prior Publication Data
US 2023/0087887 A1     Mar. 23, 2023

(51) Int. Cl.
*H04W 74/0808* (2024.01)
(52) U.S. Cl.
CPC ................ *H04W 74/0808* (2013.01)
(58) Field of Classification Search
CPC .............. H04W 74/0808; Y02D 30/70
See application file for complete search history.

(56) References Cited

U.S. PATENT DOCUMENTS

| 9,386,516 B2 * | 7/2016 | Liu ........................ H04W 4/08 |
| 11,523,306 B1 * | 12/2022 | Chu ....................... H04L 69/324 |

(Continued)

FOREIGN PATENT DOCUMENTS

| GB | 2603939 A | * | 8/2022 | ......... H04L 47/2416 |
| GB | 2615916 A | * | 8/2023 | ............ H04W 48/14 |
| WO | WO-2021109063 A1 | | 6/2021 | |
| WO | WO-2022166157 A1 | * | 8/2022 | |

OTHER PUBLICATIONS

Stephane Baron (Canon), "Low-Latency Triggered TWT", Dec. 7, 2020, IEEE 802.11-20/1843r1 Retrieved from the Internet: URL:https://mentor.ieee.org/802.11/dcn/20/11-20-1843-01-00be-low-latency-triggered-twt.pptx [Retrieved on Sep. 27, 2023], slides 1-13 (Year: 2020).*

(Continued)

*Primary Examiner* — Ayaz R Sheikh
*Assistant Examiner* — Mang Boi Thawng
(74) *Attorney, Agent, or Firm* — Kevin M. Donnelly; Holland & Hart LLP

(57) ABSTRACT

This disclosure provides methods, devices and systems for protecting latency-sensitive communications, during restricted target wake time (r-TWT) service periods (SPs), from non-legacy STAs that do not support r-TWT operation. Some implementations more specifically relate to preventing STAs that are not members of an r-TWT SP from acquiring transmit opportunities (TXOPs) that would otherwise overlap with the start of the r-TWT SP. In some implementations, the AP may require all non-legacy STAs associated with its basic service set (BSS) to support r-TWT operation. In some other implementations, the AP may attempt to capture a wireless channel associated with the r-TWT SP within a fixed period preceding the r-TWT SP. In some other implementations, the AP may require all associated STAs to transmit a request-to-send (RTS) frame when attempting to acquire a TXOP. Still further, in some implementations, the AP may limit the duration of TXOPs acquired by non-member STAs.

26 Claims, 19 Drawing Sheets

(56) References Cited

U.S. PATENT DOCUMENTS

| | | | |
|---|---|---|---|
| 2006/0193279 A1* | 8/2006 | Gu | H04W 74/06 370/312 |
| 2014/0092857 A1* | 4/2014 | Kneckt | H04W 74/04 370/329 |
| 2016/0381704 A1* | 12/2016 | Chu | H04W 52/0216 370/329 |
| 2017/0064741 A1* | 3/2017 | Zhou | H04W 74/0816 |
| 2018/0115950 A1* | 4/2018 | Asterjadhi | H04W 76/28 |
| 2019/0274166 A1* | 9/2019 | Seok | H04W 88/08 |
| 2021/0144698 A1* | 5/2021 | Kwon | H04W 76/14 |
| 2021/0250858 A1* | 8/2021 | Chen | H04W 72/23 |
| 2021/0250963 A1 | 8/2021 | Seok et al. | |
| 2023/0026249 A1* | 1/2023 | Chu | H04W 52/0248 |
| 2024/0008119 A1 | 1/2024 | Kim et al. | |
| 2024/0022947 A1* | 1/2024 | Sevin | H04W 28/0215 |
| 2024/0114455 A1* | 4/2024 | Baek | H04W 56/0015 |
| 2024/0179744 A1* | 5/2024 | Baek | H04W 74/0808 |

OTHER PUBLICATIONS

Chunyu Hu (Facebook Inc.), "Protected TWT Enhancement for Latency Sensitive Traffic", Jul. 29, 2020, IEEE 802.11-20/1046r14 Retrieved from the Internet: URL:https://mentor.ieee.org/802.11/dcn/20/11-20-1046-14-00be-prioritized-edca-channe1-access-slot-management.pptx [Retrieved on Sep. 27, 2023], sides 1-22 (Year: 2020).*

802.11 Working Group of the LAN/MAN Standards Committee of the IEEE Computer Society: "IEEE P802.11 be/D1.01, Draft Standard for Information Technology-Tele-Communications and Information Exchange Between Systems Local and Metropolitan Area Networks-Specific Requirements, Part 11: Wireless LAN MAC and Physical Layer Specifications, Amendment 8: Enhancements for EHT", Piscataway, NJ, USA, pp. 1-679, Jun. 30, 2021, XP068192080, p. 134, 139, Sec.9.4.2.199, 9.4.2.295b, p. 295, 300, Sec. 35.3.12.6, 35.3.13, Fig.35-14, 35-16.

International Search Report and Written Opinion—PCT/US2022/039683—ISA/EPO—Jun. 6, 2023.

* cited by examiner

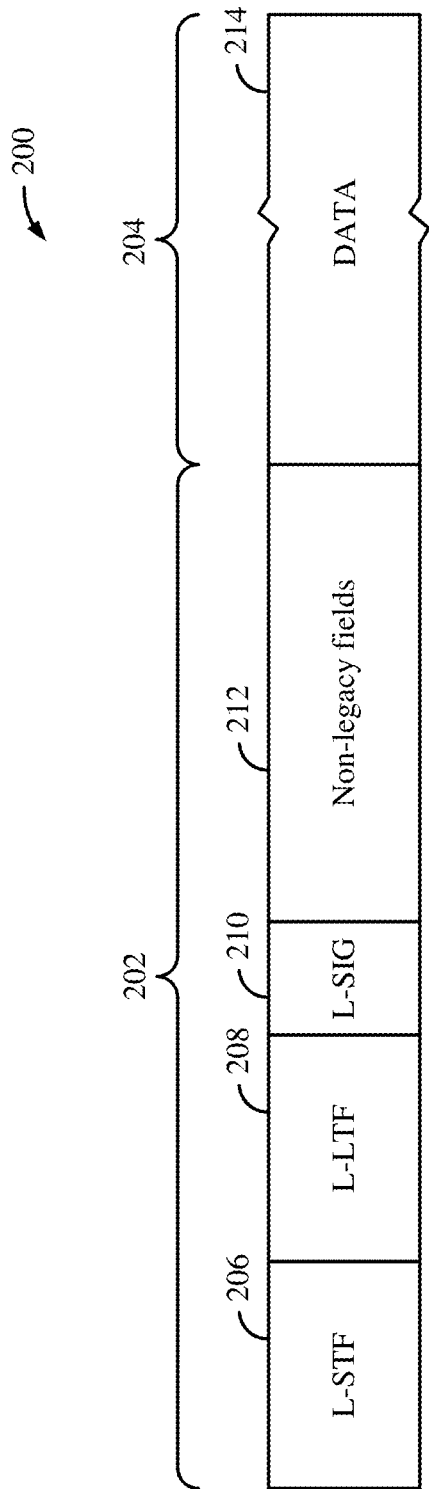
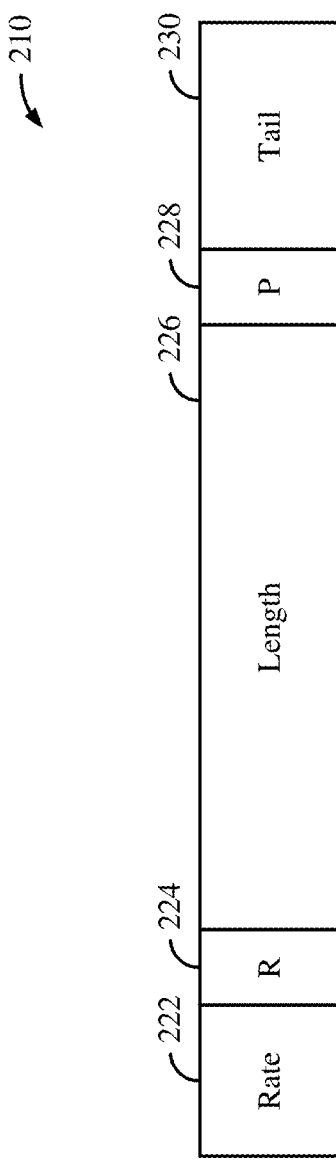
*Figure 2A*
*Figure 2B*

TRAFFIC MANAGEMENT FOR WIRELESS STATIONS (STAs) THAT DO NOT SUPPORT RESTRICTED TARGET WAKE TIME (r-TWT) OPERATION

TECHNICAL FIELD

This disclosure relates generally to wireless communication, and more specifically, to managing data traffic for wireless stations (STAs) that do not support restricted target wake time (r-TWT) operation.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include buffering one or more downlink (DL) packets based on a timing of a first restricted target wake time (r-TWT) service period (SP); performing a channel sensing operation that indicates whether a wireless channel associated with the first r-TWT SP is busy or idle; and transmitting the buffered DL packets, over the wireless channel, to one or more first wireless stations (STAs) associated with a basic service set (BSS) based on a duration that the wireless channel is idle between a first time and the start of the first r-TWT SP, where the first time occurs a fixed duration prior to the start of the first r-TWT SP.

In some implementations, the one or more first STAs may not be associated with the first r-TWT SP. In some aspects, the method may further include scheduling a second r-TWT SP to follow the first r-TWT SP by less than a threshold duration, where the one or more first STAs are not associated with any of the first or second r-TWT SPs. In some implementations, the buffered DL packets may span a maximum transmit opportunity (TXOP) duration allowed by the BSS. In some implementations, the fixed duration may be greater than or equal to a point coordination function (PCF) interframe space (PIFS) duration plus a maximum TXOP duration allowed by the BSS.

In some aspects, the transmitting of the buffered DL packets may include acquiring a TXOP on the wireless channel prior to the start of the first r-TWT SP and responsive to the channel sensing operation indicating that the wireless channel is idle for at least a PIFS duration after the first time, where at least one of the buffered DL packets is transmitted during the TXOP. In some implementations, the TXOP may terminate at the start of the first r-TWT SP. In some other aspects, the transmitting of the buffered DL packets may include acquiring a TXOP on the wireless channel after the end of the first r-TWT SP based on the channel sensing operation indicating that the wireless channel is not idle for at least a PIFS duration between the first time and the start of the first r-TWT SP, where at least one of the buffered DL packets is transmitted during the TXOP.

In some other aspects, the transmitting of the buffered DL packets may include acquiring a TXOP on the wireless channel during the first r-TWT SP based on the channel sensing operation indicating that the wireless channel is not idle for at least a PIFS duration between the first time and the start of the first r-TWT SP, where at least one of the buffered DL packets is transmitted during the TXOP. In some implementations, the method may further include communicating, during the first r-TWT SP, with one or more second STAs associated with the first r-TWT SP, where the TXOP is acquired during a remainder of the first r-TWT SP following the communications with the one or more second STAs. In some implementations, the method may further include communicating, during the remainder of the first r-TWT SP, with one or more third STAs that are not associated with the r-TWT SP.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including buffering one or more DL packets based on a timing of a first r-TWT SP; performing a channel sensing operation that indicates whether a wireless channel associated with the first r-TWT SP is busy or idle; and transmitting the buffered DL packets, over the wireless channel, to one or more first STAs associated with a BSS based on a duration that the wireless channel is idle between a first time and the start of the first r-TWT SP, where the first time occurs a fixed duration prior to the start of the first r-TWT SP.

Another innovative aspect of the subject matter described in this disclosure can be implemented as a method of wireless communication. The method may be performed by a wireless communication device and may include transmitting one or more packets carrying BSS information indicating one or more requirements associated with r-TWT operation in a BSS; and associating with one or more STAs based on the BSS information carried in the one or more packets, where the one or more STAs indicate support for the one or more requirements associated with r-TWT operation in the BSS.

In some aspects, the BSS information may be carried in a non-legacy operation element and may indicate that STAs associated with the BSS must support r-TWT operation. In some other aspects, the BSS information may indicate a maximum TXOP duration allowed by the BSS for STAs that are not associated with an r-TWT SP. In some implementations, the BSS information may be dynamically updated based on a timing of the r-TWT SP. In some other implementations, the maximum TXOP duration may span a single medium access control (MAC) service data unit (MSDU).

Still further, in some aspects, the BSS information may be carried in a legacy operation element and may indicate that STAs associated with the BSS must perform request-to-send (RTS)/clear-to-send (CTS) exchanges to acquire TXOPs that exceed a threshold duration. In some implementations, the threshold duration may be equal to 32 microseconds. In some implementations, the method may further include receiving, at a first time, an RTS frame from a first STA requesting a TXOP that exceeds the threshold duration, where the first time occurs prior to the start of an r-TWT SP; and selectively responding to the RTS frame based on the requested TXOP and a duration between the first time and the start of the r-TWT SP.

In some implementations, the selective responding to the RTS frame may include transmitting a CTS frame that allocates the requested TXOP to the first STA based on the requested TXOP being shorter than or equal to the duration between the first time and the start of the r-TWT SP. In some implementations, the method may further include allocating the requested TXOP to the first STA after the start of the r-TWT SP based on the requested TXOP being longer than the duration between the first time and the start of the r-TWT SP.

In some implementations, the selective responding to the RTS frame may include transmitting a CTS frame that allocates, to the first STA, a TXOP shorter than the requested TXOP based on the requested TXOP being longer than the duration between the first time and the start of the r-TWT SP. In some other implementations, the selective responding to the RTS frame may include transmitting a CTS-to-self frame that reserves a TXOP longer than or equal to the requested TXOP based on the requested TXOP being longer than the duration between the first time and the start of the r-TWT SP. Still further, in some implementations, the wireless communication device may not respond to the RTS frame based on the requested TXOP being longer than the duration between the first time and the start of the r-TWT SP.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including transmitting one or more packets carrying BSS information indicating one or more requirements associated with r-TWT operation in a BSS; and associating with one or more STAs based on the BSS information carried in the one or more packets, where the one or more STAs indicate support for the one or more requirements associated with r-TWT operation in the BSS.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 2A shows an example protocol data unit (PDU) usable for communications between an access point (AP) and one or more wireless stations (STAs).

FIG. 2B shows an example field in the PDU of FIG. 2A.

Like reference numbers and designations in the various drawings indicate like elements.

DETAILED DESCRIPTION

Figure 1:
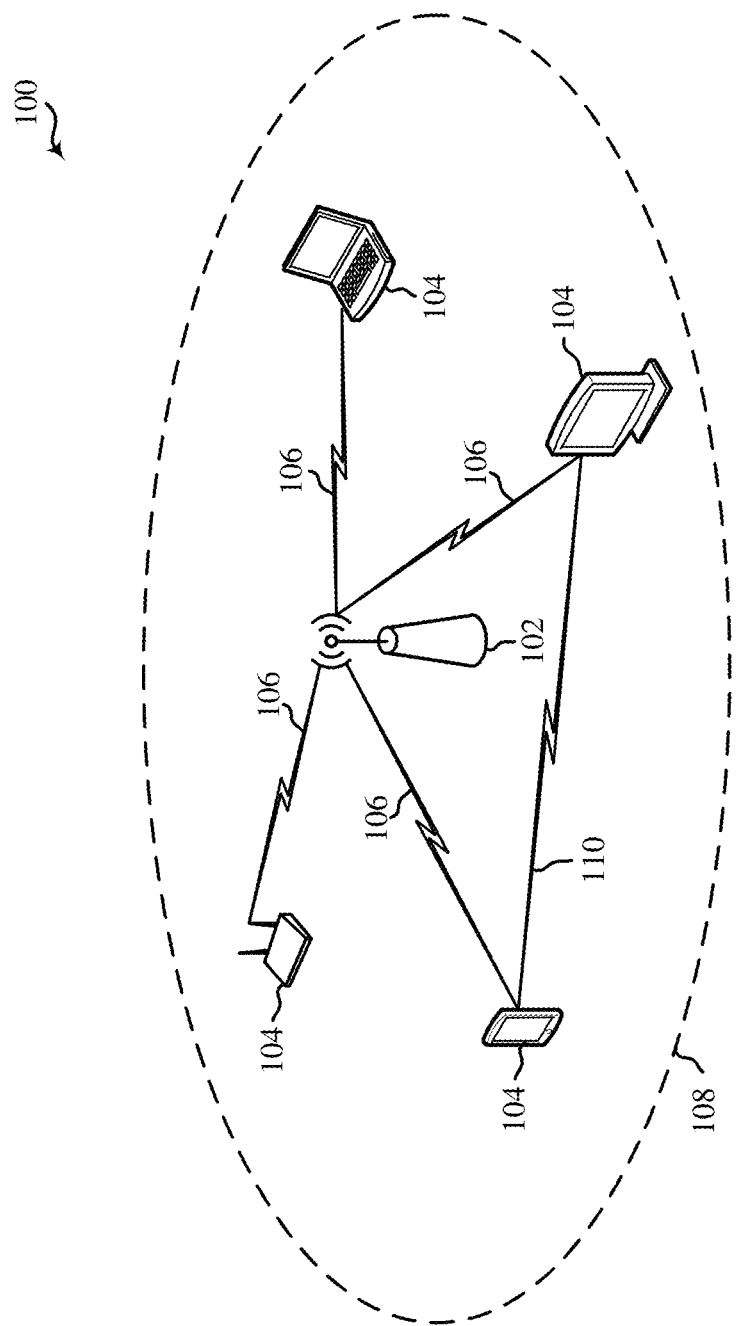
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Many wireless networks use random channel access mechanisms to control access to a shared wireless medium. In these wireless networks, wireless communication devices (including access points (APs) and wireless stations (STAs)) contend with one another using carrier sense multiple access with collision avoidance (CSMA/CA) techniques to gain access to the wireless medium. In general, the wireless communication device that randomly selects the lowest back-off number (RBO) wins the medium access contention operation and may be granted access to the wireless medium for a period of time commonly referred to as a transmit opportunity (TXOP). Other wireless communication devices are generally not permitted to transmit during the TXOP of another wireless communication device to avoid collisions on the shared wireless medium.

Some random channel access mechanisms, such as enhanced distributed channel access (EDCA), afford high-priority traffic a greater likelihood of gaining medium access than low-priority traffic. EDCA classifies data into different access categories (ACs) such as, for example, voice (AC_VO), video (AC_VI), best effort (AC_BE), and background (AC_BK). Each AC is associated with a different priority level and may be assigned a different range of RBOs so that higher priority data is more likely to win a TXOP than lower priority data (such as by assigning lower RBOs to higher priority data and assigning higher RBOs to lower priority data). Although EDCA increases the likelihood that low-latency data traffic will gain access to a shared wireless medium during a given contention period, unpredictable outcomes of medium access contention operations may prevent low-latency applications from achieving certain levels of throughput or satisfying certain latency requirements.

The IEEE 802.11be amendment of the IEEE 802.11 standard describes a restricted target wake time (r-TWT) service period (SP) that can be used to provide more predictable latency, reduced worst case latency, or reduced jitter, with higher reliability for latency-sensitive traffic. As used herein, the term "non-legacy STA" refers to any STA that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and are TXOP holders outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. However, some non-legacy STAs may not support r-TWT operation may thus ignore the scheduling of quiet intervals and r-TWT SPs. In some instances, such non-legacy STAs may occupy a shared wireless medium at the start of an r-TWT SP, thereby blocking or delaying access to low-latency STAs that are members of the SP. Accordingly, new communication protocols or mechanisms are needed to further protect latency-sensitive traffic in r-TWT SPs.

Various aspects relate generally to latency-sensitive communications, and more particularly, to protecting latency-sensitive communications, during r-TWT SPs, from non-legacy STAs that do not support r-TWT operation. In some aspects, an AP may prevent STAs that are not members of a given r-TWT SP (also referred to herein as "non-member STAs") from acquiring TXOPs that would otherwise overlap with the start of the r-TWT SP. In some implementations, the AP may require all non-legacy STAs associated with its basic service set (BSS) to support r-TWT operation. As such, all non-member STAs associated with the BSS must terminate their TXOPs before the start of the r-TWT SP. In some other implementations, the AP may attempt to capture a wireless channel associated with the r-TWT SP within a fixed period preceding the r-TWT SP. As a result, the AP may acquire a TXOP that prevents other STAs from transmitting on the wireless channel immediately before the start of the r-TWT SP. In some other implementations, the AP may require all associated STAs to transmit a request-to-send (RTS) frame when attempting to acquire a TXOP. This allows the AP to deny access to any STAs requesting a TXOP that would otherwise overlap with the start of the r-TWT SP. Still further, in some implementations, the AP may limit the duration of TXOPs acquired by non-member STAs. This may reduce the impact of any TXOPs which may delay or otherwise interfere with low-latency communications during the r-TWT SP.

Particular implementations of the subject matter described in this disclosure can be implemented to realize one or more of the following potential advantages. By preventing non-member STAs from acquiring TXOPs that would otherwise overlap with the start of an r-TWT SP, aspects of the present disclosure may significantly improve the latency gains achievable by latency-sensitive traffic through application of r-TWT SPs. For example, a non-legacy STA that does not support r-TWT operation may acquire a TXOP that extends beyond the start of an r-TWT SP, thereby blocking or delaying channel access to low-latency STAs that are members of the r-TWT SP. In the present implementations, an AP may protect low-latency STAs from losing medium access at the start of an r-TWT SP, for example, by requiring all associated non-legacy STAs to support r-TWT operation, by capturing the wireless channel within a fixed period preceding the r-TWT SP. by requiring all associated STAs to request TXOPs (using RTS frames), or by limiting the duration of TXOPs acquired prior to the r-TWT SP. As such, aspects of the present disclosure may ensure that latency-sensitive traffic is prioritized over all other traffic during an r-TWT SP. As a result, r-TWT SPs may provide more predictable latency, reduced worst case latency, or reduced jitter, with higher reliability for latency-sensitive traffic.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ or 6 GHZ bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
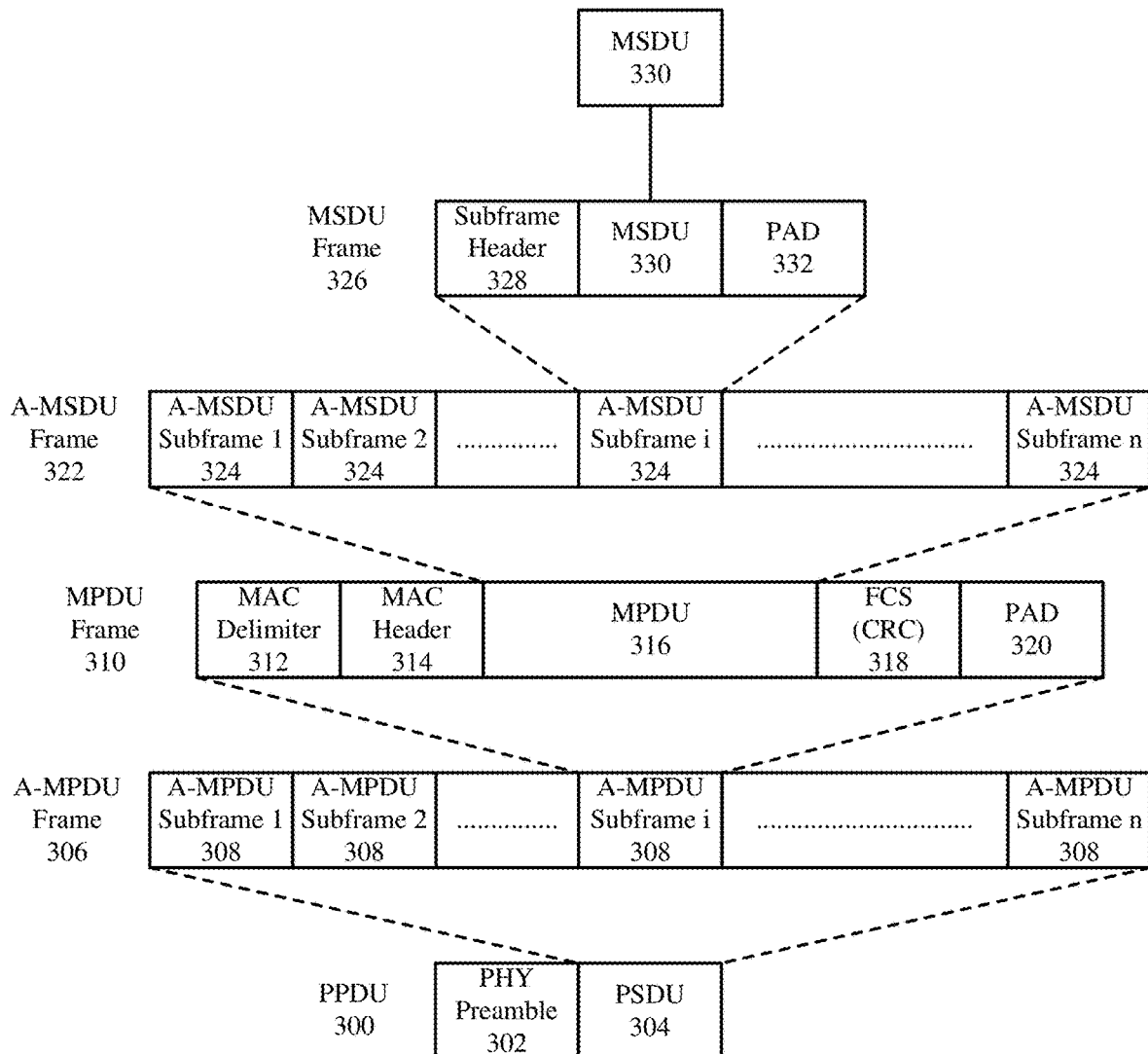
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
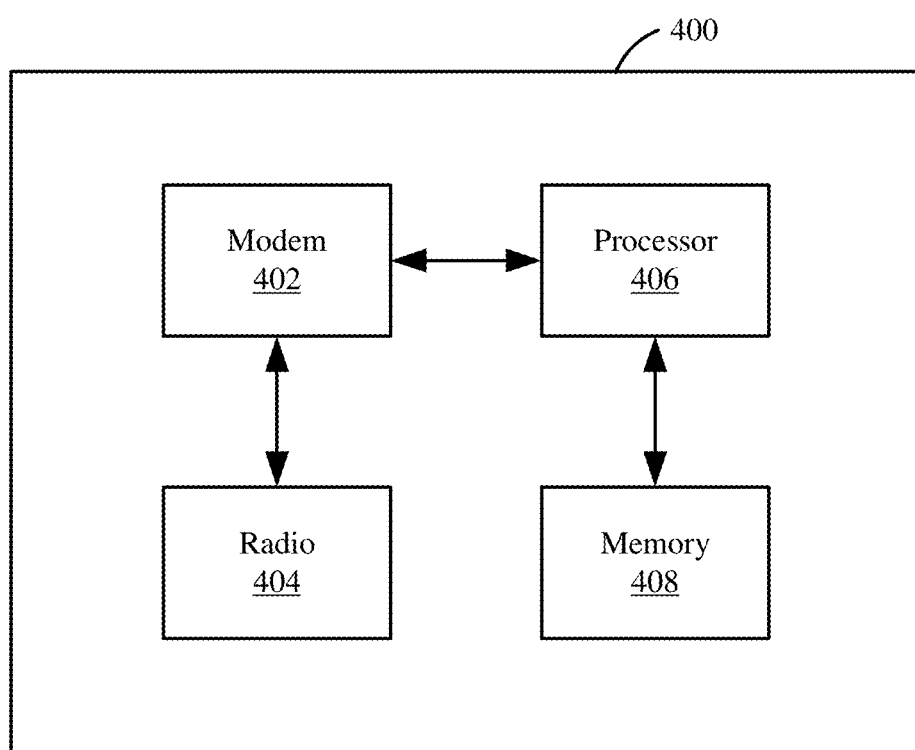
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11bc.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 400 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques.

In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
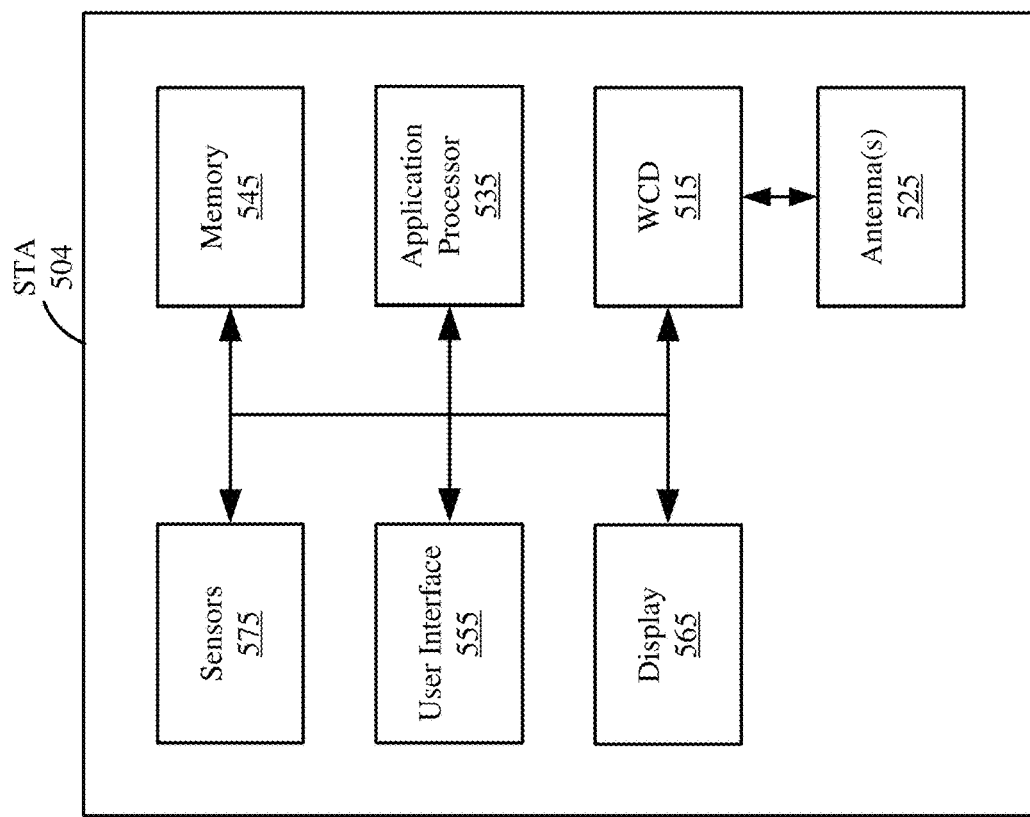
FIG. 5B shows a block diagram of an example STA.
Figure 5A:
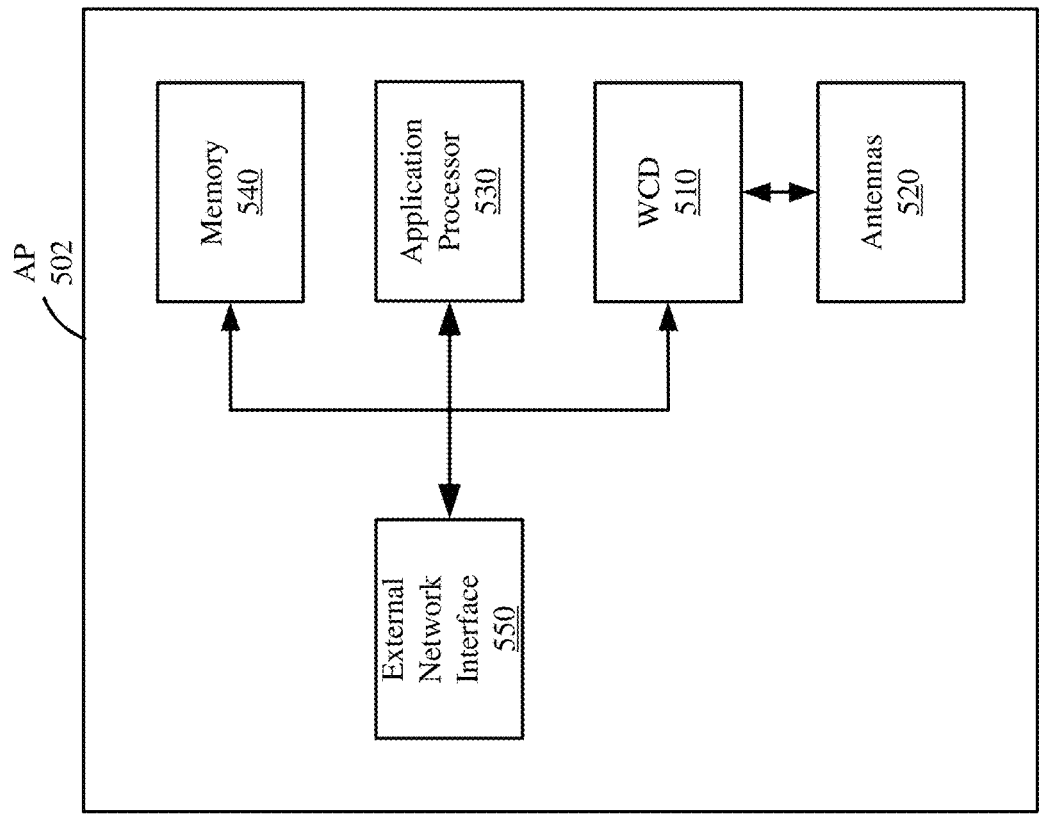
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, the IEEE 802.11be amendment of the IEEE 802.11 standard describes an r-TWT SP that can be used to provide more predictable latency, reduced worst case latency, or reduced jitter, with higher reliability for latency-sensitive traffic. As used herein, the term "non-legacy STA" refers to any STA that supports the IEEE 802.11be amendment, or future generations, of the IEEE 802.11 standard, while the term "low-latency STA" refers to any non-legacy STA that has latency-sensitive traffic to send or receive. In contrast, the term "legacy STA" may refer to any STA that only supports the IEEE 802.11ax, or earlier generations, of the IEEE 802.11 standard. Non-legacy STAs that support r-TWT operation and are TXOP holders outside of an r-TWT SP must terminate their respective TXOPs before the start of any r-TWT SP for which they are not a member. Further, an AP may suppress traffic from all legacy STAs during an r-TWT SP by scheduling a quiet interval to overlap with the r-TWT SP. However, some non-legacy STAs may not support r-TWT operation may thus ignore the scheduling of quiet intervals and r-TWT SPs. In some instances, such non-legacy STAs may occupy a shared wireless medium at the start of an r-TWT SP, thereby blocking or delaying access to low-latency STAs that are members of the SP. Accordingly, new communication protocols or mechanisms are needed to further protect latency-sensitive traffic in r-TWT SPs.

Various aspects relate generally to latency-sensitive communications, and more particularly, to protecting latency-sensitive communications, during r-TWT SPs, from non-legacy STAs that do not support r-TWT operation. In some aspects, an AP may prevent STAs that are not members of a given r-TWT SP (also referred to herein as "non-member STAs") from acquiring TXOPs that would otherwise overlap with the start of the r-TWT SP. In some implementations, the AP may require all non-legacy STAs associated with its BSS to support r-TWT operation. As such, all non-member STAs associated with the BSS must terminate their TXOPs before the start of the r-TWT SP. In some other implementations, the AP may attempt to capture a wireless channel associated with the r-TWT SP within a fixed period preceding the r-TWT SP. As a result, the AP may acquire a TXOP that prevents other STAs from transmitting on the wireless channel immediately before the start of the r-TWT SP. In some other implementations, the AP may require all associated STAs to transmit an RTS frame when attempting to acquire a TXOP. This allows the AP to deny access to any STAs requesting a TXOP that would otherwise overlap with the start of the r-TWT SP. Still further, in some implementations, the AP may limit the duration of TXOPs acquired by non-member STAs. This may reduce the impact of any TXOPs which may delay or otherwise interfere with low-latency communications during the r-TWT SP.

Particular implementations of the subject matter described in this disclosure can be implemented to realize one or more of the following potential advantages. By preventing non-member STAs from acquiring TXOPs that would otherwise overlap with the start of an r-TWT SP, aspects of the present disclosure may significantly improve the latency gains achievable by latency-sensitive traffic through application of r-TWT SPs. For example, a non-legacy STA that does not support r-TWT operation may acquire a TXOP that extends beyond the start of an r-TWT SP, thereby blocking or delaying channel access to low-latency STAs that are members of the r-TWT SP. In the present implementations, an AP may protect low-latency STAs from losing medium access at the start of an r-TWT SP, for example, by requiring all associated non-legacy STAs to support r-TWT operation, by capturing the wireless channel within a fixed period preceding the r-TWT SP, by requiring all associated STAs to request TXOPs (using RTS frames), or by limiting the duration of TXOPs acquired prior to the r-TWT SP. As such, aspects of the present disclosure may ensure that latency-sensitive traffic is prioritized over all other traffic during an r-TWT SP. As a result, r-TWT SPs may provide more predictable latency, reduced worst case latency, or reduced jitter, with higher reliability for latency-sensitive traffic.

Figure 6A:
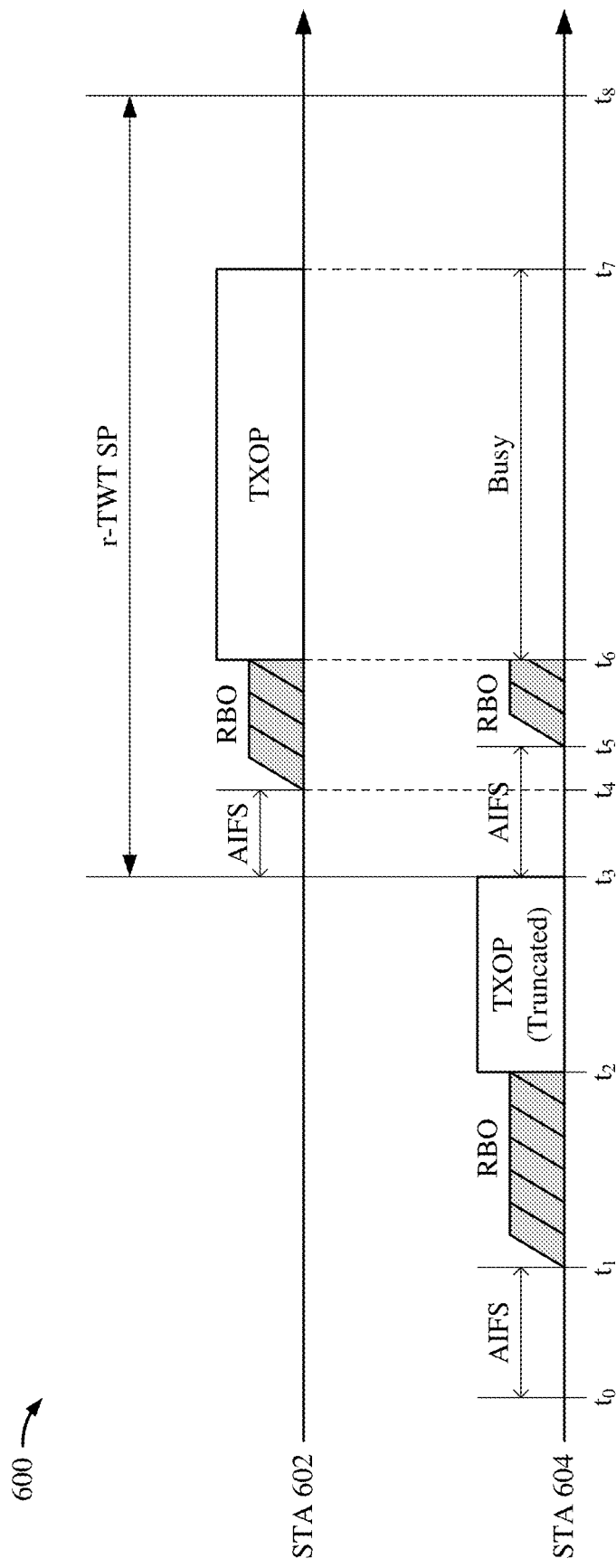
FIG. 6A shows a timing diagram depicting example wireless communications associated with a basic service set (BSS) that supports restricted target wake time (r-TWT) operation.

FIG. 6A shows a timing diagram 600 depicting example wireless communications associated with a BSS that supports r-TWT operation. In the example of FIG. 6A, the BSS may include multiple non-legacy STAs 602 and 604 that support r-TWT operation. More specifically, the STA 602 may be a low-latency STA that is a member of an r-TWT SP, which spans a duration from times $t_3$ to $t_5$, whereas the STA 604 may be a non-member STA. In some implementations, each of the STAs 602 and 604 may be one example of any of the STAs 104 or 504 of FIGS. 1 and 5B, respectively. Although two non-legacy STAs 602 and 604 are shown in the example of FIG. 6A in actual implementations, the BSS may include any number of legacy or non-legacy STAs.

The non-member STA 604 attempts to access a shared wireless channel prior to the start of the r-TWT SP. More specifically, the non-member STA 604 senses that the channel is idle for a threshold duration, from times $t_0$ to $t_1$, based on a channel sensing operation (such as clear channel assessment (CCA)) and further counts down a random backoff (RBO) duration, from times $t_1$ to $t_2$, before attempting to acquire a TXOP. For example, the threshold duration (from times $t_0$ to $t_1$) may be an arbitration interframe spacing (AIFS) duration associated with a particular access category (AC) of data traffic. Accordingly, the RBO duration (from times $t_1$ to $t_2$) may be randomly selected from a range of RBOs spanning a contention window associated with the AC. At time $t_2$, the non-member STA 604 senses that the wireless channel is still idle and proceeds to acquire a TXOP, for example, by initiating a transmission over the shared channel. In the example of FIG. 6A, the desired TXOP may be longer than the duration remaining before the start of the r-TWT SP at time $t_3$. However, because the existing rules regarding r-TWT operation require non-member STAs to terminate their TXOPs by the start of an r-TWT SP, the non-member STA 604 must truncate its TXOP between times $t_2$ to $t_3$.

The low-latency STA 602 attempts to access the shared wireless channel at the start of the r-TWT SP. In the example of FIG. 6A, the low-latency STA 602 senses that the channel is idle for an AIFS duration, from times $t_3$ to $t_4$, and further counts down an RBO duration, from times $t_4$ to $t_6$, before attempting to acquire a TXOP. As shown in FIG. 6A, the non-member STA 604 also attempts to access the shared wireless channel at the start of the r-TWT SP. For example, the non-member STA 604 senses that the channel is idle for an AIFS duration, from times $t_3$ to $t_5$, and further counts down an RBO duration beginning at time $t_5$. In some implementations, the data traffic associated with the low-latency STA 602 may be assigned to a higher-priority AC than the data traffic associated with the non-member STA 604. As such, the AIFS or RBO durations associated with the low-latency STA 602 may be shorter than the AIFS or RBO durations, respectively, associated with the non-member STA 604. As a result, the low-latency STA 602 wins access to the wireless channel, at time to, and acquires a TXOP, for example, by initiating a transmission over the shared channel.

The non-member STA 604 senses that the wireless channel is busy, at time to, and refrains from accessing the shared channel for the duration of the TXOP (from times $t_0$ to $t_7$). After the TXOP has terminated, at time $t_7$, the non-member STA 604 may once again attempt to access the wireless channel. In this manner, the r-TWT operation may prioritize latency-sensitive traffic in the BSS, for example, by requiring non-member STAs to terminate their TXOPs by the start of any r-TWT SPs of which they are not members. Additionally, an AP (not shown for simplicity) may suppress all traffic from legacy STAs associated with the BSS by scheduling a quiet interval to overlap with at least a portion of the r-TWT SP (such as one or more time-units (TUs) following time $t_3$). For example, the duration of the quiet interval may be indicated by one or more quiet elements included in management frames (such as beacon frames and probe response frames) transmitted by the AP prior to the start of the r-TWT SP. Non-legacy STAs may ignore such quiet intervals. Moreover, aspects of the present disclosure recognize that some non-legacy STAs may not support r-TWT operation and may therefore ignore the scheduling of r-TWT SPs as well.

Figure 6B:
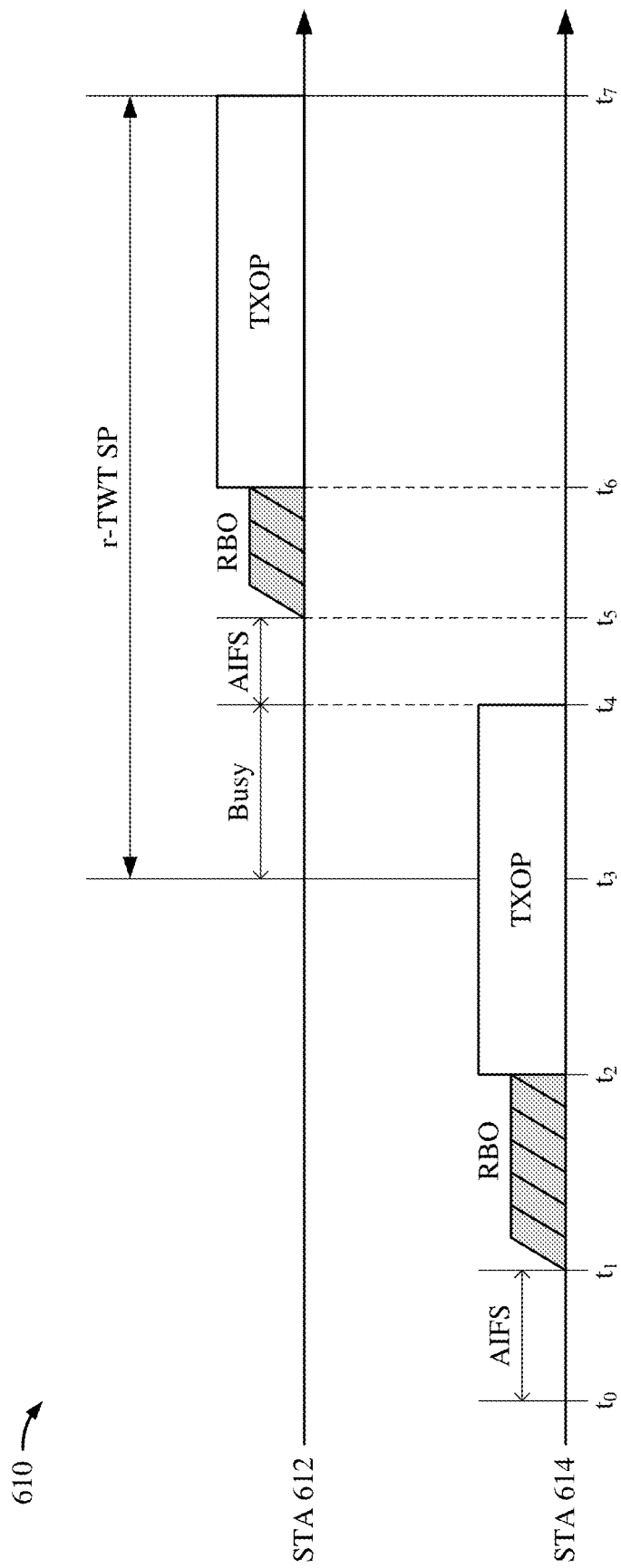
FIG. 6B shows another timing diagram depicting example wireless communications associated with a BSS that supports r-TWT operation.

FIG. 6B shows another timing diagram 610 depicting example wireless communications associated with a BSS that supports r-TWT operation. In the example of FIG. 6B, the BSS may include a non-legacy STA 612 that supports r-TWT operation and a non-legacy STA 614 that does not support r-TWT operation. More specifically, the STA 612 may be a low-latency STA that is a member of an r-TWT SP which spans a duration from times $t_3$ to $t_7$. In some implementations, each of the STAs 612 and 614 may be one example of any of the STAs 104 or 504 of FIGS. 1 and 5B, respectively. Although two non-legacy STAs 612 and 614 are shown in the example of FIG. 6B, in actual implementations the BSS may include any number of legacy or non-legacy STAs.

The non-legacy STA 614 attempts to access a shared wireless channel prior to the start of the r-TWT SP. More specifically, the non-legacy STA 614 senses that the channel is idle for an AIFS duration, from times $t_0$ to $t_1$, and further counts down an RBO duration, from times $t_1$ to $t_2$, before attempting to acquire a TXOP. In the example of FIG. 6B, the desired TXOP may be longer than the duration remaining before the start of the r-TWT SP at time $t_3$. Moreover, because the non-legacy STA 614 does not support r-TWT operation, the STA 614 may not truncate its TXOP to accommodate the start of the r-TWT SP. Thus, at time $t_2$, the non-legacy STA 614 senses that the wireless channel is still idle and proceeds to acquire a TXOP, from times $t_2$ to $t_4$, by initiating a transmission over the shared wireless channel. As a result, the non-legacy STA 614 gains access to the shared wireless channel prior to the start of the r-TWT SP (at time $t_3$) and retains access the channel beyond the start of the SP.

The low-latency STA 612 attempts to access the shared wireless channel at the start of the r-TWT SP. However, in the example of FIG. 6B, the low-latency STA 612 senses that the channel is busy from times $t_3$ to $t_4$ due to the TXOP associated with the non-legacy STA 614. After the TXOP has completed, the low-latency STA 612 senses that the channel is idle for an AIFS duration, from times $t_4$ to $t_5$, and further counts down an RBO duration from times $t_5$ to $t_6$. At time to, the low-latency STA 612 senses that the channel is still idle and proceeds to acquire a TXOP, from times $t_0$ to $t_7$, by initiating a transmission over the shared wireless channel. As shown in FIG. 6B, the TXOP acquired by the non-legacy STA 614 significantly delays channel access by the low-latency STA 612. Such delays in channel access may significantly increase the latency of data traffic associated with the low-latency STA 612.

Aspects of the present disclosure may provide greater protections for latency-sensitive traffic by preventing non-member STAs from acquiring TXOPs that overlap with the start of an r-TWT SP. In some aspects, an AP may require all non-legacy STAs associated with its BSS to support r-TWT operation. In some implementations, the AP may advertise mandatory support for r-TWT operation in management frames transmitted or broadcast to STAs in the vicinity prior to association. For example, the advertisement may be carried in a non-legacy (or Extremely High Throughput (EHT)) operation element included in beacon or probe response frames. As used herein, the term "non-legacy" may refer to frame formats and communication protocols conforming to the IEEE 802.11be amendment, and future generations, of the IEEE 802.11 standard. As such, all non-legacy STAs may interpret the non-legacy operation element to determine whether they can associate with the BSS. More specifically, any non-legacy STAs attempting to associate with the BSS must indicate support for r-TWT operation, whereas any non-legacy STAs that do not support r-TWT operation must refrain from associating with the BSS.

Although mandating support for r-TWT operation provides a simple and effective means of protecting latency-sensitive traffic during r-TWT SPs, aspects of the present disclosure recognize that such requirements may impose an overly strict burden on BSS membership which can result in underutilization of the wireless channel depending on the frequency (or infrequency) of r-TWT SPs. Thus, in some other aspects, an AP may control channel access to STAs that do not support r-TWT operation (or observe scheduled quiet intervals). For example, the AP may, through explicit signaling, prevent such STAs from acquiring a TXOP that extends beyond the start of the r-TWT SP (such as described with reference to FIG. 6B).

Figure 7A:
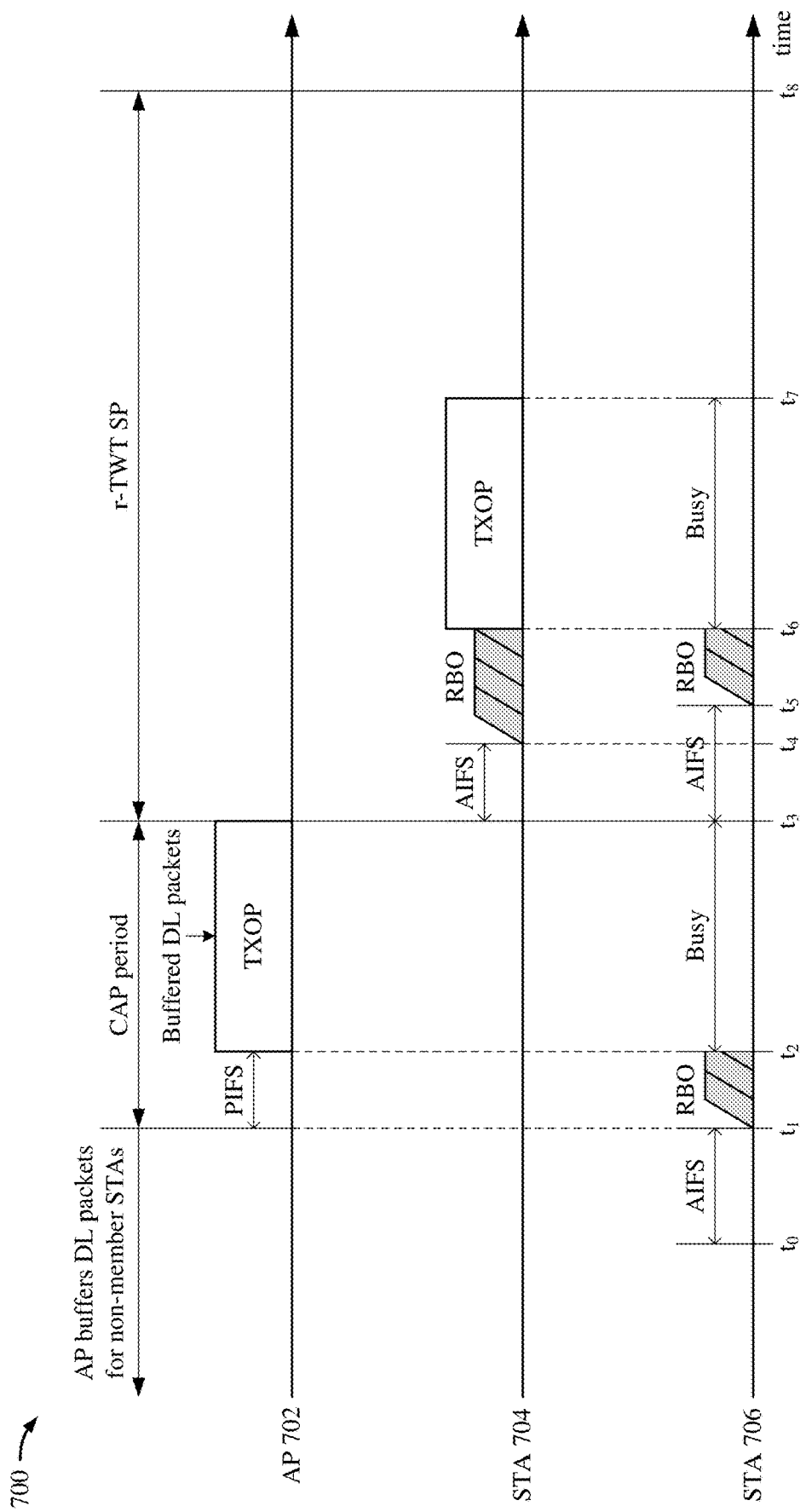
FIG. 7A shows a timing diagram depicting example wireless communications associated with a BSS that supports r-TWT operation, according to some implementations.

FIG. 7A shows a timing diagram 700 depicting example wireless communications associated with a BSS that supports r-TWT operation, according to some implementations. In the example of FIG. 7A, the BSS may include an AP 702, a non-legacy STA 704 that supports r-TWT operation and a non-legacy STA 706 that does not support r-TWT operation. More specifically, the STA 704 may be a low-latency STA that is a member of an r-TWT SP which spans a duration from times $t_3$ to $t_8$. In some implementations, the AP 702 may be one example of any of the APs 102 or 502 of FIGS. 1 and 5A, respectively. In some implementations, each of the STAs 704 and 706 may be one example of any of the STAs 104 or 504 of FIGS. 1 and 5B, respectively. Although two non-legacy STAs 704 and 706 are shown in the example of FIG. 7A, in actual implementations the BSS may include any number of legacy or non-legacy STAs.

In some aspects, the AP 702 may attempt to capture a shared wireless channel associated with the r-TWT SP during a channel access prevention (CAP) period prior to the start the r-TWT SP (such as from times $t_1$ to $t_3$). More specifically, the AP 702 attempts to acquire a TXOP that blocks channel access to other STAs associated with the BSS for the remainder of the CAP period. For example, the CAP period may span a fixed duration that ensures no other TXOPs can occur after the AP's TXOP (and before the start of the r-TWT SP) and that any TXOPs preceding the AP's TXOP shall terminate by the start of the r-TWT SP. In some implementations, the duration of the CAP period may be greater than or equal to a maximum TXOP duration allowed by the BSS plus a point coordination function (PCF) inter-frame space (PIFS) duration. The AP 702 monitors an idle duration of the wireless channel between the start of the CAP period (at time $t_1$) and the start of the r-TWT SP (at time $t_3$). If the wireless channel is idle for at least a PIFS duration during this period, the AP 702 may acquire a TXOP for the remainder of the CAP period (such that the end of the TXOP is aligned with the start of the r-TWT SP).

To optimize channel utilization, the AP 702 may use any TXOP it acquires during a CAP period to serve one or more non-member STAs. Such non-member STAs may include legacy STAs, non-legacy STAs that do not support r-TWT operation, or any non-legacy STAs that support r-TWT operation but are not members of the upcoming r-TWT SP. In some implementations, the AP 702 may buffer one or more downlink (DL) packets intended for one or more non-member STAs prior to the start of the CAP period. In other words, the AP 702 may delay transmitting such DL packets to their intended recipients until at least the start of the CAP period. To reduce the impact of the delayed transmissions, the AP 702 may only buffer DL packets that have relatively relaxed latency requirements or are associated with a relatively low-priority AC (such as AC_BE). The number of DL packets buffered by the AP 702 may depend on a desired duration of the AP's TXOP. In some implementations, the AP 702 may buffer enough DL packets to span a maximum allowable TXOP duration.

In the example of FIG. 7A, the AP 702 buffers or accumulates DL packets intended for one or more non-member STAs (which may include the non-legacy STA 706) prior to the start of the CAP period. During the CAP period, the AP 702 senses that the wireless channel is idle for a PIFS duration, from times $t_1$ and $t_2$, and acquires a TXOP that spans the remainder of the CAP period, from times $t_2$ to $t_3$. In some implementations, the AP 702 may transmit one or more of the buffered DL packets to their intended recipients during this TXOP. The non-legacy STA 706 also attempts to access the shared wireless channel prior to the start of the r-TWT SP. For example, the non-legacy STA 706 senses that the channel is idle for an AIFS duration, from times $t_0$ to $t_1$, and further counts down an RBO duration beginning at time $t_1$. However, at time $t_2$, the non-legacy STA 706 senses that the wireless channel is busy and refrains from accessing the channel for the duration of the TXOP (such as from times $t_2$ to $t_3$).

The low-latency STA 704 attempts to access the wireless channel at the start of the r-TWT SP. More specifically, the low-latency STA 704 senses that the channel is idle for an AIFS duration, from times $t_3$ to $t_4$, and further counts down an RBO duration, from times $t_4$ to $t_6$, before attempting to acquire a TXOP. As shown in FIG. 7A, the non-legacy STA 706 also attempts to access the shared wireless channel at the start of the r-TWT SP. More specifically, the non-legacy STA 706 senses that the channel is idle for an AIFS duration, from times $t_3$ to $t_5$, and further counts down an RBO duration beginning at time $t_5$. In some implementations, the data traffic associated with the low-latency STA 704 may be assigned to a higher-priority AC than the data traffic associated with the non-legacy STA 706. As a result, the low-latency STA 704 wins access to the wireless channel, at time to, and acquires a TXOP, for example, by initiating a transmission over the shared channel.

The non-legacy STA 706 senses that the wireless channel is busy, at time to, and refrains from accessing the shared channel for the duration of the TXOP (such as from times $t_6$ to $t_7$). After the TXOP has terminated, at time $t_7$, the non-legacy STA 706 may once again attempt to access the wireless channel. Thus, by preventing non-member STAs from acquiring TXOPs that overlap with the start of an r-TWT SP, aspects of the present disclosure may provide greater protections for latency-sensitive traffic during the r-TWT SP. In the example of FIG. 7A, the AP 702 is able to block all other STAs from accessing the wireless channel during the CAP period. However, in some instances, a non-member STA may gain access to the shared channel before the AP 702, thereby limiting the duration of the AP's TXOP or preventing the AP 702 from acquiring a TXOP altogether (during the CAP period). In such instances, the AP 702 may deliver the buffered DL data during, or after, the r-TWT SP (such as after all low-latency STAs that are members of the r-TWT SP have had an opportunity to access the wireless channel).

In some implementations, the AP 702 may schedule multiple r-TWT SPs to occur within close proximity of one another. For example, the AP 702 may schedule another r-TWT SP (not shown for simplicity) to begin at time $t_8$ or shortly thereafter (such as within a threshold duration following time $t_8$). This may reduce the likelihood of a non-member STA acquiring a TXOP between consecutive r-TWT SPs. In such implementations, the AP 702 may buffer DL packets (prior to time $t_1$) for non-member STAs that are not associated with any of the following r-TWT SPs (such as the r-TWT SP from times $t_3$ to $t_8$ and any subsequent r-TWT SPs following closely thereafter).

Figure 7B:
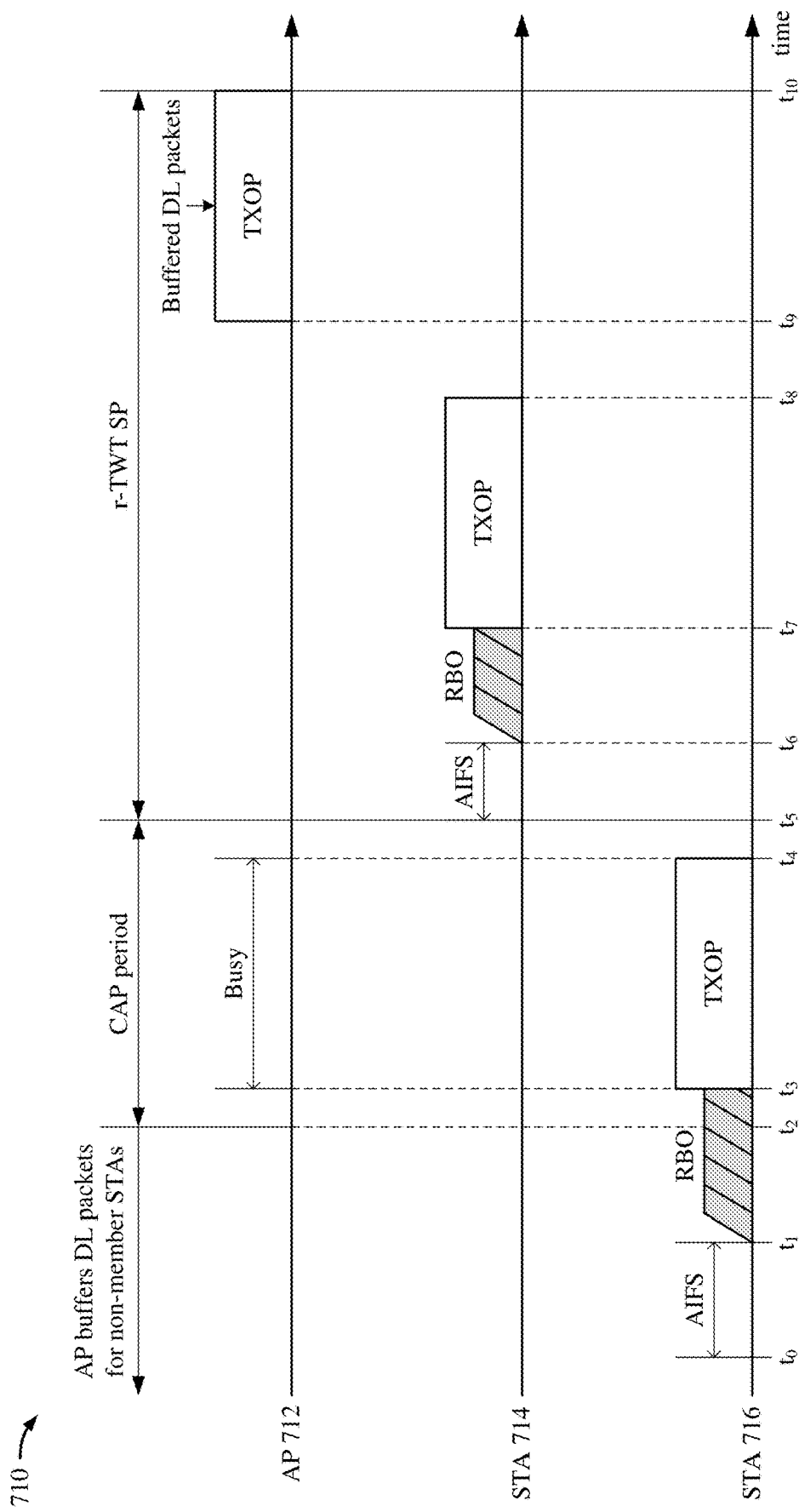
FIG. 7B shows a timing diagram depicting example wireless communications associated with a BSS that supports r-TWT operation, according to some implementations.

FIG. 7B shows a timing diagram 710 depicting example wireless communications associated with a BSS that supports r-TWT operation, according to some implementations. In the example of FIG. 7B, the BSS may include an AP 712, a non-legacy STA 714 that supports r-TWT operation and a non-legacy STA 716 that does not support r-TWT operation. More specifically, the STA 714 may be a low-latency STA that is a member of an r-TWT SP which spans a duration from times $t_5$ to $t_{10}$. In some implementations, the AP 712 may be one example of any of the APs 102 or 502 of FIGS. 1 and 5A, respectively. In some implementations, each of the STAs 714 and 716 may be one example of any of the STAs 104 or 504 of FIGS. 1 and 5B, respectively. Although two non-legacy STAs 714 and 716 are shown in the example of FIG. 7B, in actual implementations the BSS may include any number of legacy or non-legacy STAs.

In some aspects, the AP 712 may attempt to capture a shared wireless channel associated with the r-TWT SP during a CAP period prior to the start the r-TWT SP (such as from times $t_2$ to $t_5$). In some implementations, the duration of the CAP period may be greater than or equal to a maximum TXOP duration allowed by the BSS plus a PIFS duration. As described with reference to FIG. 7A, if the wireless channel is idle for at least a PIFS duration during the CAP period, the AP 712 may acquire a TXOP for the remainder of the CAP period (such that the end of the TXOP is aligned with the start of the r-TWT SP). In some implementations, the AP 712 may buffer one or more DL packets intended for one or more non-member STAs prior to the start of the CAP period. As described with reference to FIG. 7A, the AP 712 may only buffer DL packets that have relatively relaxed latency requirements or are associated with a relatively low-priority AC (such as AC_BE). In some implementations, the AP 712 may buffer enough DL packets to span a maximum allowable TXOP duration.

In the example of FIG. 7B, the AP 712 buffers or accumulates DL packets intended for one or more non-member STAs (which may include the non-legacy STA 716) prior to the start of the CAP period. The non-legacy STA 716 also attempts to access the shared wireless channel prior to the start of the r-TWT SP. For example, the non-legacy STA 716 senses that the channel is idle for an AIFS duration, from times $t_0$ to $t_1$, and counts down an RBO duration from times $t_1$ to $t_3$. At time $t_3$, the non-legacy STA 716 senses that the channel is still idle and proceeds to acquire a TXOP from times $t_3$ to $t_4$. As shown in FIG. 7B, this TXOP occurs within the CAP period. More specifically, the TXOP begins less than a PIFS duration after the start of the CAP period and ends less than a PIFS duration before the start of the r-TWT SP. For example, the non-legacy STA's TXOP may span a maximum TXOP duration allowed by the BSS. As a result, the AP 712 may not acquire a TXOP during the CAP period. However, by configuring the CAP period to be equal to the maximum allowable TXOP duration plus a PIFS duration, other STAs also may not acquire a TXOP during this period. As such, no TXOPs can overlap with the start of the r-TWT SP.

The low-latency STA 714 attempts to access the wireless channel at the start of the r-TWT SP. More specifically, the low-latency STA 714 senses that the channel is idle for an AIFS duration, from times $t_5$ to $t_6$, and further counts down an RBO duration from times to to $t_7$. At time $t_7$, the low-latency STA 714 senses that the channel is still idle and proceeds to acquire a TXOP from times $t_7$ to $t_5$. In the example of FIG. 7B, the TXOP associated with the low-latency STA 714 terminates before the end of the r-TWT SP and the non-legacy STA 716 does not contend for a subsequent TXOP during the SP. However, the AP 712 still has buffered DL packets for one or more non-member STAs. Thus, in some implementations, the AP 712 may utilize the remainder of the r-TWT SP to serve one or more non-member STAs. For example, the AP 712 may first determine that no other members of the r-TWT SP have data to transmit or receive during the r-TWT SP (such as by sensing that the channel has been idle for a threshold duration). The AP 712 may then acquire a TXOP, from times $t_0$ to $t_{10}$, and transmit the buffered DL packets (or various other packets including, but not limited to, management frames) to one or more non-member STAs during the TXOP.

In some aspects, the AP 712 may acquire a TXOP after the end of the r-TWT SP (such as after time $t_{10}$) to deliver the buffered DL packets. For example, in some instances, the AP 712 may be unable to acquire a TXOP within the remaining duration of the r-TWT SP (if any). In some implementations, the AP 712 may refrain from even attempting to transmit any of the buffered DL packets during the r-TWT SP (such as to avoid interfering with communications by any low-latency STAs that are members of the SP). Aspects of the present disclosure further recognize that, depending on the amount of buffered DL packets and the availability of the wireless channel, the AP 712 may require multiple TXOPs to deliver all the buffered DL packets to the one or more non-member STAs. As such, the AP 712 may acquire a TXOP before the r-TWT SP (as described with reference to FIG. 7A), during the r-TWT SP (as described with reference to FIG. 7B), after the r-TWT SP (not shown for simplicity), or any combination thereof, to transmit the buffered DL packets.

In some implementations, the AP 712 may schedule multiple r-TWT SPs to occur within close proximity of one another. For example, the AP 712 may schedule another r-TWT SP (not shown for simplicity) to begin at time tro or shortly thereafter (such as within a threshold duration following time to). This may reduce the likelihood of a non-member STA acquiring a TXOP between consecutive r-TWT SPs. In such implementations, the AP 712 may buffer DL packets (prior to time $t_2$) for non-member STAs that are not associated with any of the following r-TWT SPs (such as the r-TWT SP from times $t_5$ to $t_{10}$ and any subsequent r-TWT SPs following closely thereafter).

Figure 8A:
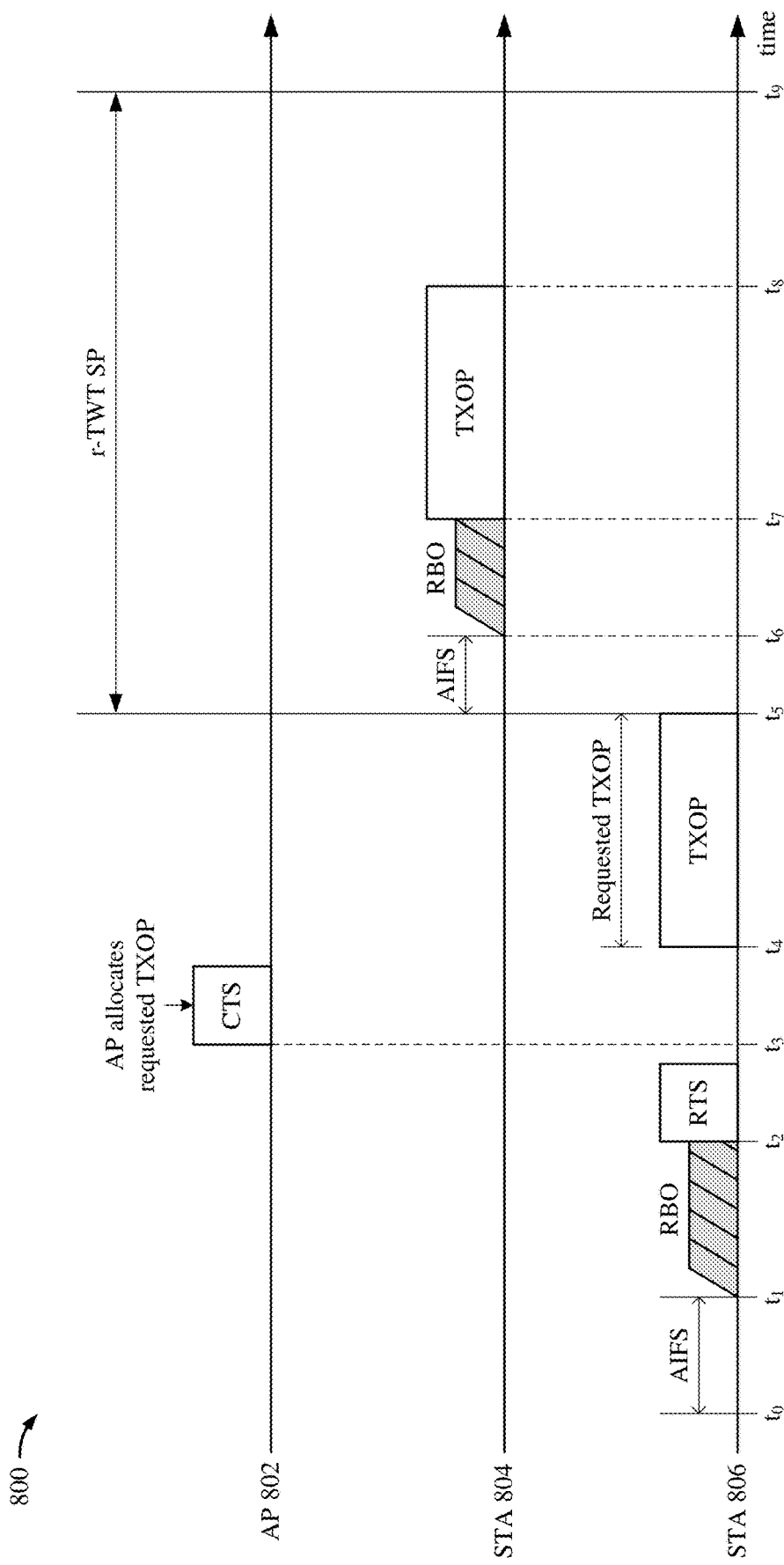
FIG. 8A shows a timing diagram depicting example wireless communications associated with a BSS that supports r-TWT operation, according to some implementations.

FIG. 8A shows a timing diagram 800 depicting example wireless communications associated with a BSS that supports r-TWT operation, according to some implementations. In the example of FIG. 8A, the BSS may include an AP 802, a non-legacy STA 804 that supports r-TWT operation and a non-legacy STA 806 that does not support r-TWT operation. More specifically, the STA 804 may be a low-latency STA that is a member of an r-TWT SP which spans a duration from times $t_5$ to $t_9$. In some implementations, the AP 802 may be one example of any of the APs 102 or 502 of FIGS. 1 and 5A, respectively. In some implementations, each of the STAs 804 and 806 may be one example of any of the STAs 104 or 504 of FIGS. 1 and 5B, respectively. Although two non-legacy STAs 804 and 806 are shown in the example of FIG. 8A, in actual implementations the BSS may include any number of legacy or non-legacy STAs.

In some aspects, the AP 802 may arbitrate TXOP requests from STAs associated with its BSS attempting to access a shared wireless channel associated with the r-TWT SP. For example, the IEEE 802.11ax amendment of the IEEE 802.11 standard provides a TXOP duration-based request-to-send (RTS)/clear-to-send (CTS) operation which requires STAs to perform an RTS/CTS message exchange with the AP 802 when attempting to acquire a TXOP longer than a threshold duration. More specifically, the IEEE 802.11ax amendment defines a TXOP duration RTS threshold subfield in a legacy (or High Efficiency (HE)) operation element that can be used to specify the threshold TXOP duration for which an RTS/CTS message exchange is required. As used herein, the term "legacy" may refer to frame formats and communication protocols conforming to the IEEE 802.11ax amendment of the IEEE 802.11 standard.

In some implementations, the AP 802 may set the TXOP duration RTS threshold subfield of the legacy operation element included in beacon or probe response frames (not shown for simplicity) to a minimum threshold duration (such as 32 µs). As such, the AP 802 may require all associated STAs to initiate an RTS/CTS exchange when attempting to acquire a TXOP of any desired length on the shared wireless channel. In some aspects, the STA 802 may selectively respond to the RTS frame based on the desired length of the TXOP and an amount of time remaining before the start of the r-TWT SP. More specifically, the AP 802 may transmit a CTS frame granting the requested TXOP (indicated by the RTS frame) only if the desired length is less than or equal to the amount of time remaining before the start of the r-TWT SP.

In the example of FIG. 8A, the non-legacy STA 806 attempts to access the shared wireless channel prior to the start of the r-TWT SP. For example, the non-legacy STA 806 senses that the channel is idle for an AIFS duration, from times $t_0$ to $t_1$, and counts down an RBO duration from times $t_1$ to $t_2$. At time $t_2$, the non-legacy STA 806 senses that the wireless channel is still idle and proceeds to transmit an RTS frame requesting a TXOP from times $t_4$ to $t_5$. For example, the RTS frame includes a MAC header having a duration field set to the desired TXOP duration. In the example of FIG. 8A, the AP 802 may determine (based on the value of the duration field of the RTS frame) that the requested TXOP will terminate by the start of the r-TWT SP. As such, the AP 802 may transmit a CTS frame, at time $t_3$, granting the requested TXOP. For example, the CTS frame includes a MAC header having a duration field indicating the allocated TXOP duration. Thus, the duration field of the CTS frame may be set to the same value as the duration field of the RTS frame.

The low-latency STA 804 attempts to access the wireless channel at the start of the r-TWT SP. More specifically, the low-latency STA 804 senses that the channel is idle for an AIFS duration, from times $t_5$ to $t_6$, and further counts down an RBO duration from times $t_6$ to $t_7$. At time $t_7$, the low-latency STA 804 senses that the channel is still idle and proceeds to acquire a TXOP from times $t_7$ to $t_8$. Thus, by requiring all STAs associated with the BSS to request TXOPs via RTS/CTS exchanges, the AP 802 can more precisely regulate access to the shared wireless channel prior to the start of an r-TWT SP. For example, by determining the desired lengths of requested TXOPs, the AP 802 may screen TXOP requests based on the amount of time remaining before the start of the r-TWT SP. As shown in FIG. 8A, this allows the AP 802 to grant any requested TXOP that will terminate by the start of the r-TWT SP (regardless of how much time is remaining before the start of the r-TWT SP).

Figure 8B:
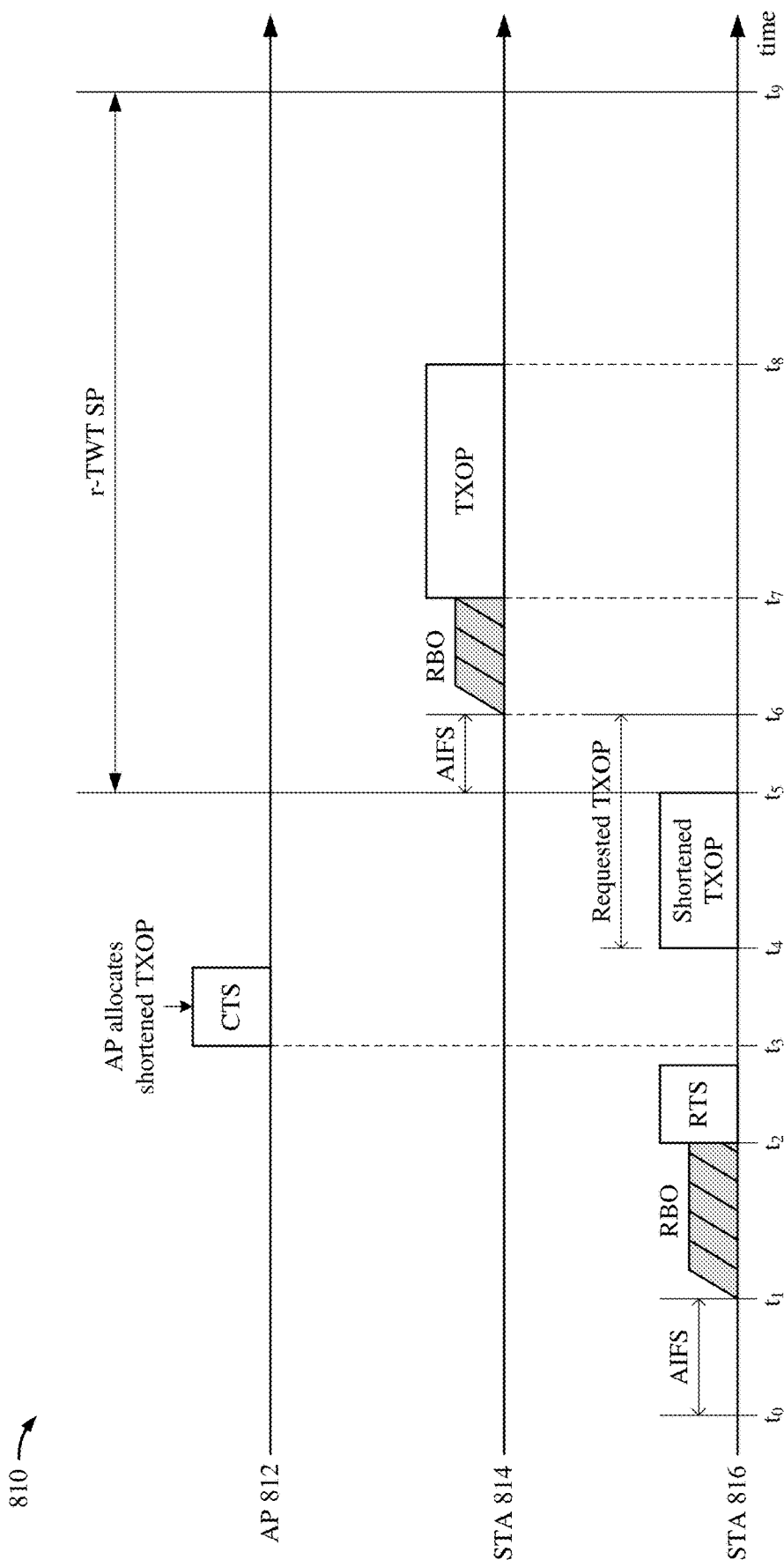
FIG. 8B shows a timing diagram depicting example wireless communications associated with a BSS that supports r-TWT operation, according to some implementations.

FIG. 8B shows a timing diagram 810 depicting example wireless communications associated with a BSS that supports r-TWT operation, according to some implementations. In the example of FIG. 8B, the BSS may include an AP 812, a non-legacy STA 814 that supports r-TWT operation and a non-legacy STA 816 that does not support r-TWT operation. More specifically, the STA 814 may be a low-latency STA that is a member of an r-TWT SP which spans a duration from times $t_5$ to $t_9$. In some implementations, the AP 812 may be one example of any of the APs 102 or 502 of FIGS. 1 and 5A, respectively. In some implementations, each of the STAs 814 and 816 may be one example of any of the STAs 104 or 504 of FIGS. 1 and 5B, respectively. Although two non-legacy STAs 814 and 816 are shown in the example of FIG. 8B, in actual implementations the BSS may include any number of legacy or non-legacy STAs.

In some aspects, the AP 812 may arbitrate TXOP requests from STAs associated with its BSS attempting to access a shared wireless channel associated with the r-TWT SP. In some implementations, the AP 812 may set the TXOP duration RTS threshold subfield of the legacy operation element included in beacon or probe response frames (not shown for simplicity) to a minimum threshold duration (such as 32 µs). Thus, as described with reference to FIG. 8A, the AP 812 may require all associated STAs to initiate an RTS/CTS exchange when attempting to acquire a TXOP of any desired length on the shared wireless channel. In some aspects, the STA 812 may selectively respond to the RTS frame based on the desired length of the TXOP and an amount of time remaining before the start of the r-TWT SP. In some implementations, the AP 812 may transmit a CTS frame granting a shorter TXOP (than the requested TXOP indicated in the RTS frame) if the desired length is greater than the amount of time remaining before the start of the r-TWT SP.

In the example of FIG. 8B, the non-legacy STA 816 attempts to access the shared wireless channel prior to the start of the r-TWT SP. For example, the non-legacy STA 816 senses that the channel is idle for an AIFS duration, from times $t_0$ to $t_1$, and counts down an RBO duration from times $t_1$ to $t_2$. At time $t_2$, the non-legacy STA 816 senses that the wireless channel is still idle and proceeds to transmit an RTS frame requesting a TXOP from times $t_4$ to $t_6$. In the example of FIG. 8B, the AP 812 may determine (based on the value of the duration field of the RTS frame) that the requested TXOP will not terminate by the start of the r-TWT SP. As such, the AP 812 may transmit a CTS frame, at time $t_3$, granting a shortened TXOP. More specifically, the shortened TXOP may be configured to terminate by or before the start of the r-TWT SP. Thus, as shown in FIG. 8B, the shortened TXOP may only span a duration from times $t_4$ to $t_5$. For example, the duration field of the CTS frame may be set to a lower value than the duration field of the RTS frame.

The low-latency STA 814 attempts to access the wireless channel at the start of the r-TWT SP. More specifically, the low-latency STA 814 senses that the channel is idle for an AIFS duration, from times $t_5$ to $t_6$, and further counts down an RBO duration from times to to $t_7$. At time $t_7$, the low-latency STA 814 senses that the channel is still idle and proceeds to acquire a TXOP from times $t_7$ to $t_8$. Thus, by requiring all STAs associated with the BSS to request TXOPs via RTS/CTS exchanges, the AP 812 can more precisely regulate access to the shared wireless channel prior to the start of an r-TWT SP. With reference for example to FIG. 8B, this may allow the AP 812 to grant a shortened TXOP in response to any request for a TXOP that will not terminate by the start of the r-TWT SP.

Figure 8C:
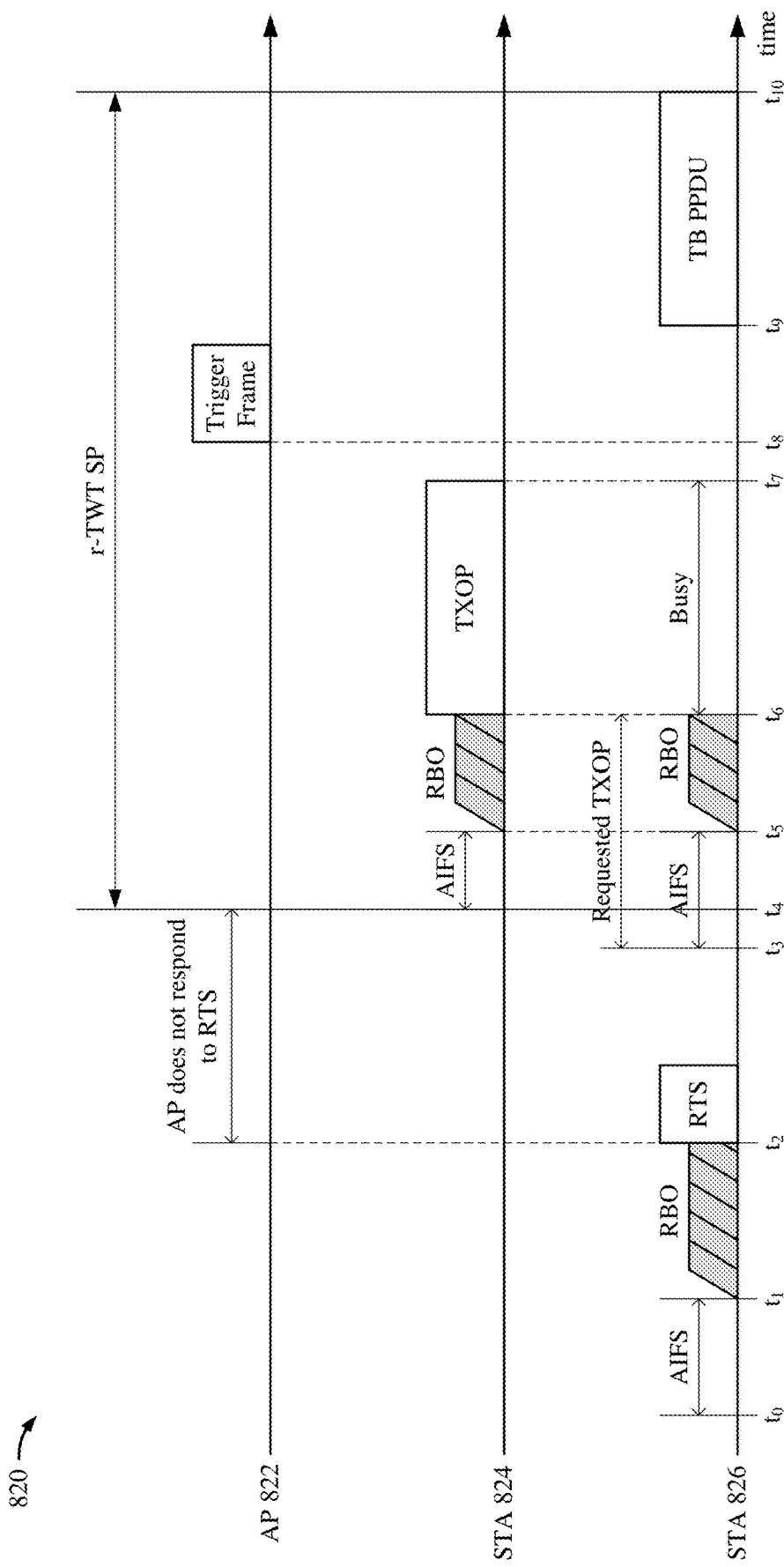
FIG. 8C shows a timing diagram depicting example wireless communications associated with a BSS that supports r-TWT operation, according to some implementations.

FIG. 8C shows a timing diagram 820 depicting example wireless communications associated with a BSS that supports r-TWT operation, according to some implementations. In the example of FIG. 8C, the BSS may include an AP 822, a non-legacy STA 824 that supports r-TWT operation and a non-legacy STA 826 that does not support r-TWT operation. More specifically, the STA 824 may be a low-latency STA that is a member of an r-TWT SP which spans a duration from times $t_5$ to $t_9$. In some implementations, the AP 822 may be one example of any of the APs 102 or 502 of FIGS. 1 and 5A, respectively. In some implementations, each of the STAs 824 and 826 may be one example of any of the STAs 104 or 504 of FIGS. 1 and 5B, respectively. Although two non-legacy STAs 824 and 826 are shown in the example of FIG. 8C, in actual implementations the BSS may include any number of legacy or non-legacy STAs.

In some aspects, the AP 822 may arbitrate TXOP requests from STAs associated with its BSS attempting to access a shared wireless channel associated with the r-TWT SP. In some implementations, the AP 822 may set the TXOP duration RTS threshold subfield of the legacy operation element included in beacon or probe response frames (not shown for simplicity) to a minimum threshold duration (such as 32 μs). Thus, as described with reference to FIG. 8A, the AP 822 may require all associated STAs to initiate an RTS/CTS exchange when attempting to acquire a TXOP of any desired length on the shared wireless channel. In some aspects, the STA 822 may selectively respond to the RTS frame based on the desired length of the TXOP and an amount of time remaining before the start of the r-TWT SP. In some implementations, the AP 822 may not respond to an RTS frame if the desired length of the requested TXOP is greater than the amount of time remaining before the start of the r-TWT SP.

In the example of FIG. 8C, the non-legacy STA 826 attempts to access the shared wireless channel prior to the start of the r-TWT SP. For example, the non-legacy STA 826 senses that the channel is idle for an AIFS duration, from times $t_0$ to $t_1$, and counts down an RBO duration from times $t_1$ to $t_2$. At time $t_2$, the non-legacy STA 826 senses that the wireless channel is still idle and proceeds to transmit an RTS frame requesting a TXOP from times $t_3$ to $t_6$. In the example of FIG. 8C, the AP 822 may determine (based on the value of the duration field of the RTS frame) that the requested TXOP will not terminate by the start of the r-TWT SP. As such, the AP 822 may not respond to the RTS frame transmitted by the non-legacy STA 826. After failing to receive a response from the AP 822 (within a threshold duration after transmitting the RTS frame), the non-legacy STA 826 enters an exponential backoff before attempting to request a TXOP once again.

The low-latency STA 824 attempts to access the wireless channel at the start of the r-TWT SP. More specifically, the low-latency STA 824 senses that the channel is idle for an AIFS duration, from times $t_5$ to $t_6$, and further counts down an RBO duration from times to to $t_7$. At time $t_7$, the low-latency STA 824 senses that the channel is still idle and proceeds to acquire a TXOP from times $t_7$ to $t_5$. In the example of FIG. 8C, the non-legacy STA 826 once again attempts to access the wireless channel prior to the start of the r-TWT SP. More specifically, the non-legacy STA 826 senses that the channel is idle for an AIFS duration, from times $t_3$ to $t_5$, and begins counting down a new RBO duration beginning at time $t_5$. In some implementations, the data traffic associated with the low-latency STA 824 may be assigned to a higher-priority AC than the data traffic associated with the non-legacy STA 826. As a result, the low-latency STA 824 wins access to the wireless channel, at time to, and acquires a TXOP, for example, by initiating a transmission over the shared channel.

The non-legacy STA 826 senses that the wireless channel is busy, at time to, and refrains from accessing the shared channel for the duration of the TXOP (such as from times $t_6$ to $t_7$). In the example of FIG. 8A, the TXOP associated with the low-latency STA 824 terminates before the end of the r-TWT SP. Aspects of the present disclosure recognize that, at the termination of the low-latency STA's TXOP (at time $t_7$), the AP 822 is aware that the non-legacy STA 826 still has data to transmit (as a result of denying the TXOP requested at time $t_2$). In some implementations, the AP 822 may utilize the remainder of the r-TWT SP to allocate a TXOP to the non-legacy STA 826. For example, the AP 822 may first determine that no other members of the r-TWT SP have data to transmit or receive during the r-TWT SP (such as by sensing that the channel has been idle for a threshold duration). The AP 822 may then transmit a trigger frame, at time $t_5$, soliciting a trigger-based (TB) PPDU from the non-legacy STA 826 between times ty and $t_{10}$.

In the example of FIG. 8C, the AP 822 is shown to allocate a TXOP to the non-legacy STA 826 in the form of a TB PPDU. However, in some other implementations, the AP 822 may use various other mechanisms to allocate the TXOP to the non-legacy STA 826. In some aspects, the AP 822 may allocate a TXOP to the non-legacy STA 826 after the end of the r-TWT SP (such as after time $t_{10}$). For example, in some instances, the AP 822 may be unable to allocate a TXOP within the remaining duration of the r-TWT SP (if any). In some implementations, the AP 822 may refrain from even attempting to allocate a TXOP to any non-member STAs during the r-TWT SP. By requiring all STAs associated with the BSS to request TXOPs via RTS/CTS exchanges, the AP 822 can more precisely regulate access to the shared wireless channel prior to the start of an r-TWT SP. With reference for example to FIG. 8C, this may allow the AP 822 to deny any request for a TXOP that will not terminate by the start of the r-TWT SP.

Figure 8D:
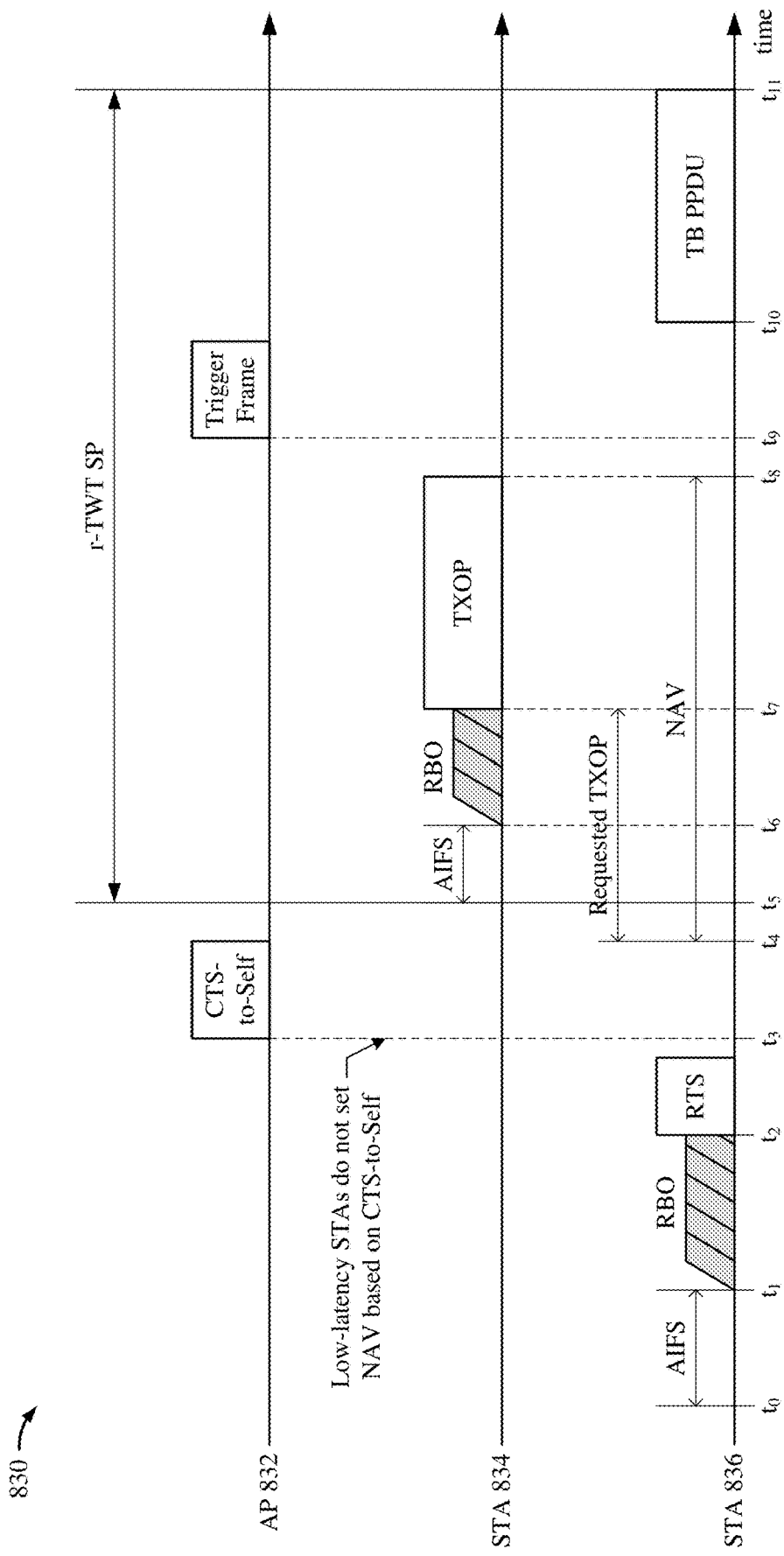
FIG. 8D shows a timing diagram depicting example wireless communications associated with a BSS that supports r-TWT operation, according to some implementations.

FIG. 8D shows a timing diagram 830 depicting example wireless communications associated with a BSS that supports r-TWT operation, according to some implementations. In the example of FIG. 8D, the BSS may include an AP 832, a non-legacy STA 834 that supports r-TWT operation and a non-legacy STA 836 that does not support r-TWT operation. More specifically, the STA 834 may be a low-latency STA that is a member of an r-TWT SP which spans a duration from times $t_5$ to $t_9$. In some implementations, the AP 832 may be one example of any of the APs 102 or 502 of FIGS. 1 and 5A, respectively. In some implementations, each of the STAs 834 and 836 may be one example of any of the STAs 104 or 504 of FIGS. 1 and 5B, respectively. Although two non-legacy STAs 834 and 836 are shown in the example of FIG. 8D, in actual implementations the BSS may include any number of legacy or non-legacy STAs.

In some aspects, the AP 832 may arbitrate TXOP requests from STAs associated with its BSS attempting to access a shared wireless channel associated with the r-TWT SP. In some implementations, the AP 832 may set the TXOP duration RTS threshold subfield of the legacy operation element included in beacon or probe response frames (not shown for simplicity) to a minimum threshold duration (such as 32 μs). Thus, as described with reference to FIG. 8A, the AP 832 may require all associated STAs to initiate an RTS/CTS exchange when attempting to acquire a TXOP of any desired length on the shared wireless channel. In some aspects, the STA 832 may selectively respond to the RTS frame based on the desired length of the TXOP and an amount of time remaining before the start of the r-TWT SP. In some implementations, the AP 832 may transmit a CTS-to-self frame reserving the wireless channel for itself if the desired length of the requested TXOP (indicated by the RTS frame) is greater than the amount of time remaining before the start of the r-TWT SP.

In the example of FIG. 8D, the non-legacy STA 836 attempts to access the shared wireless channel prior to the start of the r-TWT SP. For example, the non-legacy STA 836 senses that the channel is idle for an AIFS duration, from times $t_0$ to $t_1$, and counts down an RBO duration from times $t_1$ to $t_2$. At time $t_2$, the non-legacy STA 836 senses that the wireless channel is still idle and proceeds to transmit an RTS frame requesting a TXOP from times $t_4$ to $t_7$. In the example of FIG. 8D, the AP 832 may determine (based on the value of the duration field of the RTS frame) that the requested TXOP will not terminate by the start of the r-TWT SP. As such, the AP 832 may transmit a CTS-to-self frame, at time $t_3$, reserving the wireless channel for a threshold duration. For example, the duration field of the CTS-to-self frame may be set to a value greater than or equal to any remaining duration before the start of the r-TWT SP.

In some implementations, the duration field of the CTS-to-self frame may be set to the duration of a quiet interval associated with the r-TWT SP. For example, as described with reference to FIG. 6A, the quiet interval may be used by the AP 832 to suppress all data traffic from legacy STAs associated with the BSS during at least a portion of the r-TWT SP. In some other implementations, the duration field of the CTS-to-self frame may be set to the duration of the r-TWT SP. In other words, the AP 832 may suppress all data traffic from non-member STAs for the duration of the r-TWT SP. Upon detecting the CTS-to-self frame, at time $t_3$, the non-legacy STA 836 sets its network allocation vector (NAV) for the duration indicated in the duration field of the CTS-to-self frame (such as from times $t_3$ to $t_5$). In some aspects, low-latency STAs that are members of an r-TWT SP may be configured to ignore any CTS-to-self frames that attempt to reserve the wireless channel for any portion of their r-TWT SP. For example, the low-latency STA 834 may not set its NAV according to the duration indicated by the duration field of the CTS-to-self frame transmitted at time $t_3$.

Thus, the low-latency STA 834 attempts to access the wireless channel at the start of the r-TWT SP. More specifically, the low-latency STA 834 senses that the channel is idle for an AIFS duration, from times $t_5$ to $t_6$, and further counts down an RBO duration from times $t_6$ to $t_7$. At time $t_7$, the low-latency STA 834 senses that the channel is still idle and proceeds to acquire a TXOP from times $t_7$ to $t_8$. In the example of FIG. 8D, the TXOP associated with the low-latency STA 834 terminates before the end of the r-TWT SP. Aspects of the present disclosure recognize that, at the termination of the low-latency STA's TXOP (at time $t_5$), the AP 832 is aware that the non-legacy STA 836 still has data to transmit (as a result of denying the TXOP requested at time $t_2$). In some implementations, the AP 832 may utilize the remainder of the r-TWT SP to allocate a TXOP to the non-legacy STA 836. For example, the AP 832 may first determine that no other members of the r-TWT SP have data to transmit or receive during the r-TWT SP (such as by sensing that the channel has been idle for a threshold duration). The AP 832 may then transmit a trigger frame, at time to, soliciting a TB PPDU from the non-legacy STA 836 between times $t_{10}$ and th.

In the example of FIG. 8D, the AP 832 is shown to allocate a TXOP to the non-legacy STA 836 in the form of a TB PPDU. However, in some other implementations, the AP 832 may use various other mechanisms to allocate the TXOP to the non-legacy STA 836. In some aspects, the AP 832 may allocate a TXOP to the non-legacy STA 836 after the end of the r-TWT SP (such as after time tro). For example, in some instances, the AP 832 may be unable to allocate a TXOP within the remaining duration of the r-TWT SP (if any). In some implementations, the AP 832 may refrain from even attempting to allocate a TXOP to any non-member STAs during the r-TWT SP. By requiring all STAs associated with the BSS to request TXOPs via RTS/CTS exchanges, the AP 832 can more precisely regulate access to the shared wireless channel prior to the start of an r-TWT SP. With reference for example to FIG. 8D, this may allow the AP 832 to deny any request for a TXOP that will not terminate by the start of the r-TWT SP.

Figure 9A:
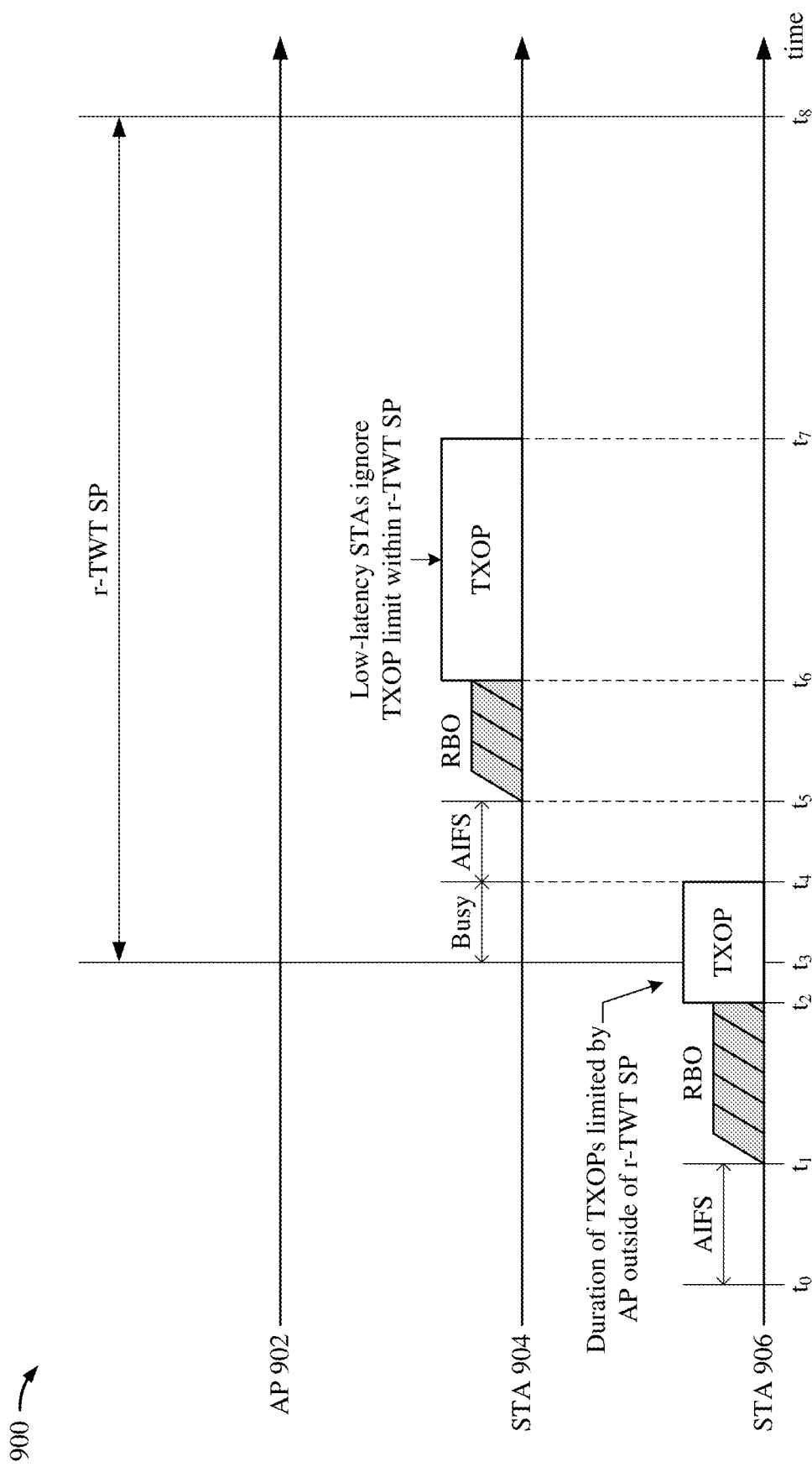
FIG. 9A shows a timing diagram depicting example wireless communications associated with a BSS that supports r-TWT operation, according to some implementations.

FIG. 9A shows a timing diagram 900 depicting example wireless communications associated with a BSS that supports r-TWT operation, according to some implementations. In the example of FIG. 9A, the BSS may include an AP 902, a non-legacy STA 904 that supports r-TWT operation and a non-legacy STA 906 that does not support r-TWT operation. More specifically, the STA 904 may be a low-latency STA that is a member of an r-TWT SP which spans a duration from times $t_3$ to $t_5$. In some implementations, the AP 902 may be one example of any of the APs 102 or 502 of FIGS. 1 and 5A, respectively. In some implementations, each of the STAs 904 and 906 may be one example of any of the STAs 104 or 504 of FIGS. 1 and 5B, respectively. Although two non-legacy STAs 904 and 906 are shown in the example of FIG. 9A, in actual implementations the BSS may include any number of legacy or non-legacy STAs.

In some aspects, the AP 902 may limit the maximum duration of TXOPs associated with non-member STAs or low-priority traffic identifiers (TIDs) prior to the start of the r-TWT SP. More specifically, the AP 902 may specify a relatively short TXOP limit (representing a maximum allowable TXOP duration) within its BSS to reduce or limit the duration that a non-member STA can access a shared wireless channel. In some implementations, the TXOP limit may only support the transmission of a single MSDU. Accordingly, the TXOP limit may reduce the likelihood that any TXOP acquired prior to the start of the r-TWT SP will extend into the SP. Further, the TXOP limit may mitigate delays incurred by latency-sensitive traffic during the r-TWT SP when a TXOP acquired by a non-member STA overlaps with the SP (such as when the TXOP is acquired immediately before or during the r-TWT SP). In some implementations, low-latency STAs may ignore the TXOP limit during their respective r-TWT SPs.

In some implementations, the TXOP limit may be carried or advertised in an EDCA parameter set element of one or more management frames (such as beacons or probe responses) transmitted by the AP 902 prior to the start of the r-TWT SP. In some other implementations, the TXOP limit may be carried or advertised in a quality of service (QOS) control field of one or more MAC frames transmitted by the AP 902 prior to the start of the r-TWT SP. In some aspects, the AP 902 may dynamically adjust the TXOP limit based on the timing of one or more r-TWT SPs. For example, in some implementations, the AP 902 may increase the TXOP limit when no r-TWT SPs are scheduled to occur for a relatively long period (such as beyond one or more beacon intervals). In some other implementations, the AP 902 may reduce the TXOP limit when an r-TWT SP is scheduled to occur within a threshold period (such as within a beacon interval).

In the example of FIG. 9A, the non-legacy STA 906 attempts to access the shared wireless channel prior to the start of the r-TWT SP. For example, the non-legacy STA 906 senses that the channel is idle for an AIFS duration, from times $t_0$ to $t_1$, and counts down an RBO duration from times $t_1$ to $t_2$. At time $t_2$, the non-legacy STA 906 senses that the wireless channel is still idle and proceeds to acquire a TXOP from times $t_2$ to $t_4$. As shown in FIG. 9A, the non-legacy STA's TXOP overlaps with the beginning of the r-TWT SP. However, because this TXOP is acquired by a non-member STA outside of the r-TWT SP, the duration of the TXOP may not exceed the TXOP limit advertised by the AP 902 (such as in beacon frames, probe response frames, or other MAC frames transmitted prior to time $t_3$). Thus, in some implementations, the non-legacy STA's TXOP may only span the duration of a single MSDU.

The low-latency STA 904 attempts to access the wireless channel at the start of the r-TWT SP. However, the low-latency STA 904 senses that the channel is busy (due to the non-legacy STA's TXOP) from times $t_3$ to $t_4$. After the TXOP has completed, the low-latency STA 904 senses that the channel is idle for an AIFS duration, from times $t_4$ to $t_5$, and further counts down an RBO duration from times $t_5$ to $t_6$. At time to, the low-latency STA 904 senses that the channel is still idle and proceeds to acquire a TXOP from times to to $t_7$. In some implementations, the low-latency STA 904 may ignore the TXOP limit during the r-TWT SP. Thus, as shown in FIG. 9A, the duration of the low-latency STA's TXOP (from times $t_6$ to $t_7$) may be longer than the non-latency STA's TXOP (from times $t_2$ to $t_4$).

Although the TXOP acquired (at time $t_2$) prior to the r-TWT SP delays latency-sensitive communications by the low-latency STA 904, such delays are mitigated by the shortened duration of the TXOP (from times $t_2$ to $t_4$). In other words, the low-latency STA 904 may acquire a TXOP (during the r-TWT SP) substantially sooner than would otherwise be possible without the shortened TXOP limit (such as shown in FIG. 6B). In some implementations, the AP 902 may schedule multiple r-TWT SPs to occur within close proximity of one another. For example, the AP 902 may schedule another r-TWT SP (not shown for simplicity) to begin at time $t_5$ or shortly thereafter (such as within a threshold duration following time $t_8$). This may reduce the likelihood of a non-member STA acquiring a TXOP between consecutive r-TWT SPs.

Figure 9B:
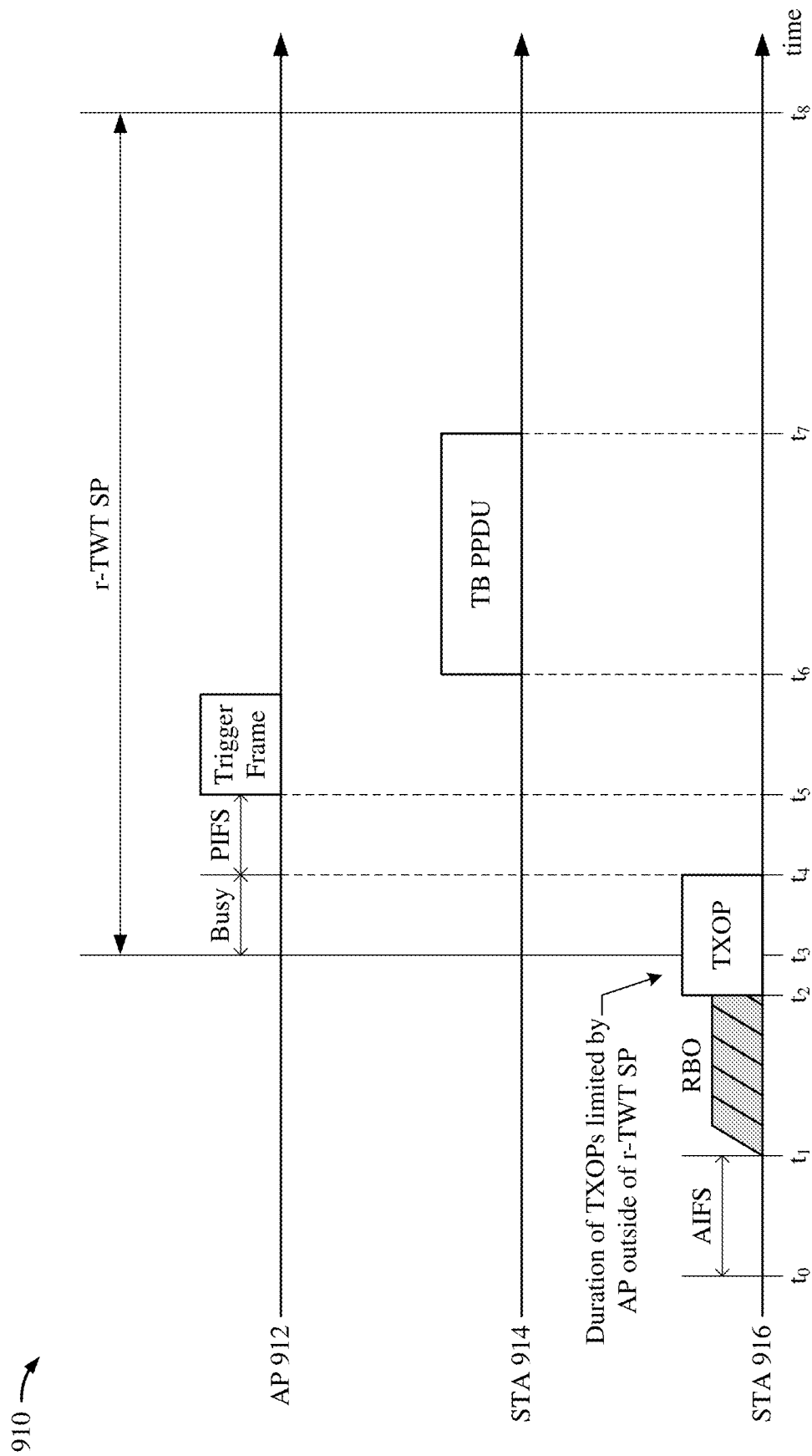
FIG. 9B shows a timing diagram depicting example wireless communications associated with a BSS that supports r-TWT operation, according to some implementations.

FIG. 9B shows a timing diagram 910 depicting example wireless communications associated with a BSS that supports r-TWT operation, according to some implementations. In the example of FIG. 9B, the BSS may include an AP 912, a non-legacy STA 914 that supports r-TWT operation and a non-legacy STA 916 that does not support r-TWT operation. More specifically, the STA 914 may be a low-latency STA that is a member of an r-TWT SP which spans a duration from times $t_5$ to $t_9$. In some implementations, the AP 912 may be one example of any of the APs 102 or 502 of FIGS. 1 and 5A, respectively. In some implementations, each of the STAs 914 and 916 may be one example of any of the STAs 104 or 504 of FIGS. 1 and 5B, respectively. Although two non-legacy STAs 914 and 916 are shown in the example of FIG. 9B, in actual implementations the BSS may include any number of legacy or non-legacy STAs.

In some aspects, the AP 912 may limit the maximum duration of TXOPs associated with non-members STAs or low-priority TIDs prior to the start of the r-TWT SP. As described with reference to FIG. 9A, the AP 912 may specify a relatively short TXOP limit (such as to support the transmission of a single MSDU) within its BSS to reduce or limit the duration that a non-member STA can access a shared wireless channel. In some implementations, the TXOP limit may be carried or advertised in an EDCA parameter set element of one or more management frames (such as beacons or probe responses) transmitted by the AP 912 prior to the start of the r-TWT SP. In some other implementations, the TXOP limit may be carried or advertised in a QoS control field of one or more MAC frames transmitted by the AP 912 prior to the start of the r-TWT SP. In some aspects, the AP 912 may dynamically adjust the TXOP limit based on the timing of one or more r-TWT SPs.

In the example of FIG. 9B, the non-legacy STA 916 attempts to access the shared wireless channel prior to the start of the r-TWT SP. For example, the non-legacy STA 916 senses that the channel is idle for an AIFS duration, from times $t_0$ to $t_1$, and counts down an RBO duration from times $t_1$ to $t_2$. At time $t_2$, the non-legacy STA 916 senses that the wireless channel is still idle and proceeds to acquire a TXOP from times $t_2$ to $t_4$. As shown in FIG. 9B, the non-legacy STA's TXOP overlaps with the beginning of the r-TWT SP. However, because this TXOP is acquired by a non-member STA outside of the r-TWT SP, the duration of the TXOP may not exceed the TXOP limit advertised by the AP 912 (such as in beacon frames, probe response frames, or other MAC frames transmitted prior to time $t_3$). Thus, in some implementations, the non-legacy STA's TXOP may only span the duration of a single MSDU.

In some aspects, the AP 912 may allocate one or more TXOPs to low-latency STAs during the r-TWT SP. In some implementations, the AP 912 may transmit a trigger frame over a shared wireless medium at the beginning of the restricted TWT SP. In the example of FIG. 9B, the AP 912 senses that the channel is busy (due to the non-legacy STA's TXOP) from times $t_3$ to $t_4$. After the TXOP has completed, the AP 912 senses that the channel is idle for a PIFS duration, from times $t_4$ to $t_5$, and proceeds to transmit a trigger frame at time $t_5$. In some implementations, the trigger frame may solicit a TB PPDU from the low-latency STA 914. As shown in FIG. 9B, the low-latency STA 914 responds to the trigger frame, at time to, by transmitting uplink (UL) data to the AP 912 in a TB PPDU spanning a duration from times $t_6$ to $t_7$.

In the example of FIG. 9B, the TB PPDU represents a TXOP for the low-latency STA 914. However, because the TB PPDU is solicited via a trigger frame (transmitted by the AP 912), the duration of the TB PPDU is not limited by the TXOP limit. As such, the AP 912 can allocate a TXOP (or TB PPDU) of any length from the low-latency STA 914. Thus, as shown in FIG. 9B, the duration of the TB PPDU (from times $t_0$ to $t_7$) may be longer than the non-latency STA's TXOP (from times $t_2$ to $t_4$). In some implementations, the AP 912 may schedule multiple r-TWT SPs to occur within close proximity of one another. For example, the AP 912 may schedule another r-TWT SP (not shown for simplicity) to begin at time $t_8$ or shortly thereafter (such as within a threshold duration following time $t_5$). This may reduce the likelihood of a non-member STA acquiring a TXOP between consecutive r-TWT SPs.

Figure 10:
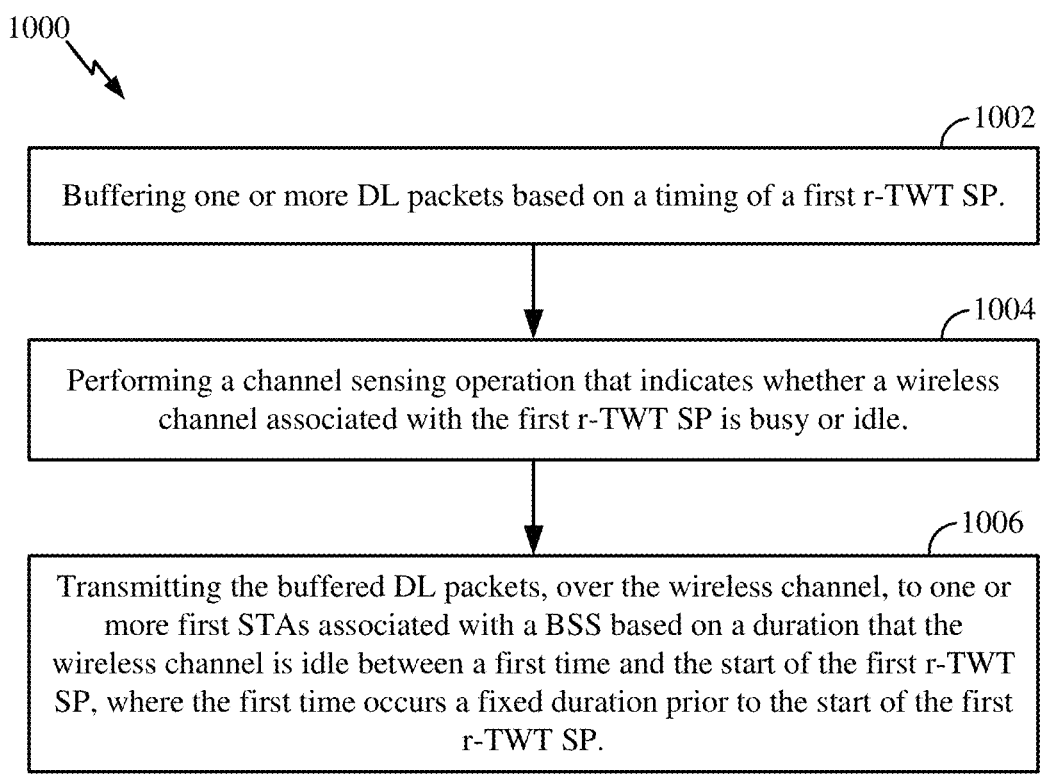
FIG. 10 shows a flowchart illustrating an example process for wireless communication that supports traffic management for STAs that do not support r-TWT operation.

FIG. 10 shows a flowchart illustrating an example process 1000 for wireless communication that supports traffic management for STAs that do not support r-TWT operation. In some implementations, the process 1000 may be performed by a wireless communication device operating as or within an AP, such as one of the APs 102 or 502 described above with reference to FIGS. 1 and 5A, respectively.

In some implementations, the process 1000 begins in block 1002 with buffering one or more DL packets based on a timing of a first r-TWT SP. In some implementations, the buffered DL packets may span a maximum TXOP allowed by the BSS. In block 1004, the process 1000 proceeds with performing a channel sensing operation that indicates whether a wireless channel associated with the first r-TWT SP is busy or idle. In block 1006, the process 1000 proceeds with transmitting the buffered DL packets, over the wireless channel, to one or more first STAs associated with a BSS based on a duration that the wireless channel is idle between a first time and the start of the first r-TWT SP, where the first time occurs a fixed duration prior to the start of the first r-TWT SP.

In some aspects, the fixed duration may be greater than or equal to a PIFS duration plus a maximum TXOP duration allowed by the BSS. In some implementations, the buffered DL packets may be transmitted during a TXOP acquired on the wireless channel prior to the start of the first r-TWT SP and responsive to the channel sensing operation indicating that the wireless channel is idle for at least a PIFS duration after the first time. In such implementations, the TXOP may terminate at the start of the first r-TWT SP. In some other implementations, the buffered DL packets may be transmitted during a TXOP acquired on the wireless channel after the end of the first r-TWT SP based on the channel sensing operation indicating that the wireless channel is not idle for at least a PIFS duration between the first time and the start of the r-TWT SP.

Still further, in some implementations, the buffered DL packets may be transmitted during a TXOP acquired on the wireless channel during the first r-TWT SP based on the channel sensing operation indicating that the wireless channel is not idle for at least a PFIS duration between the first time and the start of the first r-TWT SP. In such implementations, the wireless communication device may communicate, during the r-TWT SP, with one or more second STAs associated with the first r-TWT SP, where the TXOP is acquired during a remainder of the first r-TWT SP following the communications with the one or more second STAs. In some implementations, the wireless communication device may further communicate, during the remainder of the first r-TWT SP, with one or more third STAs that are not associated with the r-TWT SP.

In some implementations, the one or more first STAs may not be associated with the first r-TWT SP. In some implementations, the wireless communication device may schedule a second r-TWT SP to follow the first r-TWT SP by less than a threshold duration. In such implementations, the one or more first STAs may not be associated with the any of the first or second r-TWT SPs.

Figure 11A:
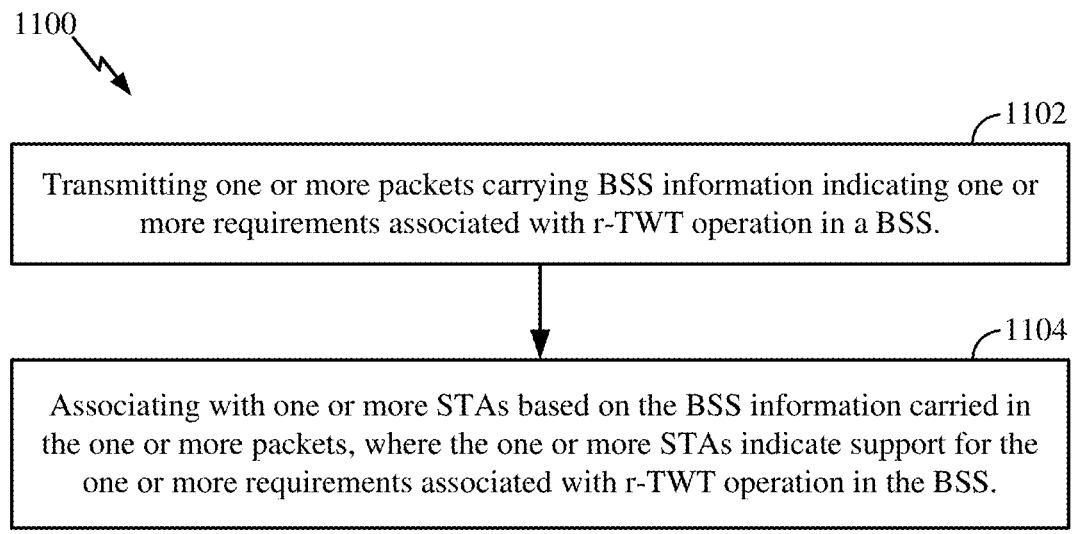
FIG. 11A shows a flowchart illustrating an example process for wireless communication that supports traffic management for STAs that do not support r-TWT operation.

FIG. 11A shows a flowchart illustrating an example process 1100 for wireless communication that supports traffic management for STAs that do not support r-TWT operation. In some implementations, the process 1100 may be performed by a wireless communication device operating as or within an AP, such as one of the APs 102 or 502 described above with reference to FIGS. 1 and 5A, respectively.

In some implementations, the process 1100 begins in block 1102 with transmitting one or more packets carrying BSS information indicating one or more requirements associated with r-TWT operation in a BSS. In block 1004, the process 1000 proceeds with associating with one or more STAs based on the BSS information carried in the one or more packets, where the one or more STAs indicate support for the one or more requirements associated with r-TWT operation in the BSS.

In some aspects, the BSS information may be carried in a non-legacy operation element and may indicate that STAs associated with the BSS must support r-TWT operation. In some other aspects, the BSS information may indicate a maximum TXOP duration allowed by the BSS for STAs that are not associated with an r-TWT SP. In some implementations, the BSS information may be dynamically updated based on a timing of the r-TWT SP. In some implementations, the maximum TXOP duration may span a single MSDU.

Still further, in some aspects, the BSS information may be carried in a legacy operation element and may indicate that STAs associated with the BSS must perform RTS/CTS exchanges to acquire TXOPs that exceed a threshold duration. In some implementations, the threshold duration may be equal to 32 µs.

Figure 11B:
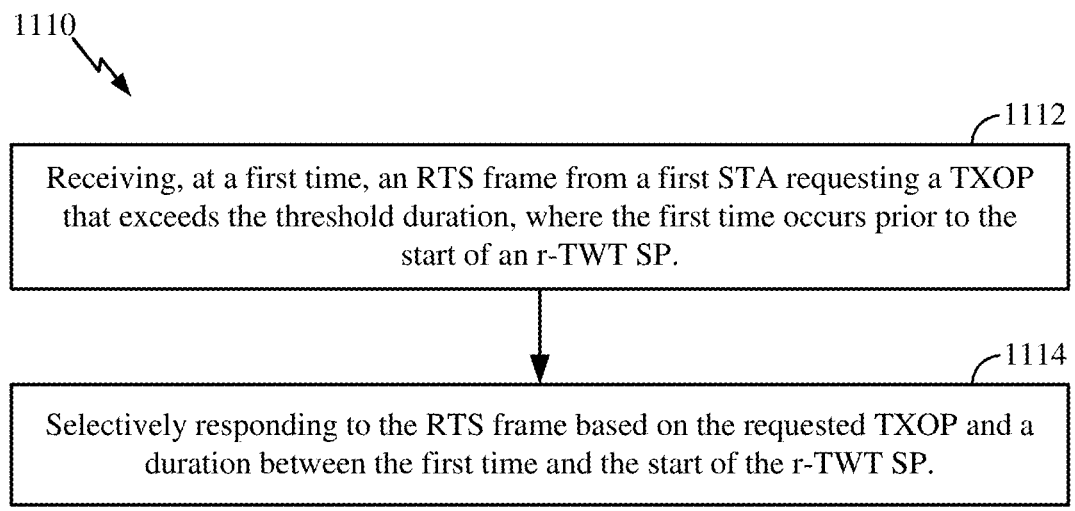
FIG. 11B shows a flowchart illustrating an example process for wireless communication that supports traffic management for STAs that do not support r-TWT operation.

FIG. 11B shows a flowchart illustrating an example process 1110 for wireless communication that supports traffic management for STAs that do not support r-TWT operation. In some implementations, the process 1110 may be performed by a wireless communication device operating as or within an AP, such as one of the APs 102 or 502 described above with reference to FIGS. 1 and 5A, respectively.

With reference for example to FIG. 11A, the process 1110 may begin, in block 1112, after the association with one or more STAs in block 1104. In some implementations, the process 1110 begins in block 1112 by receiving, at a first time, an RTS frame from a first STA requesting a TXOP that exceeds the threshold duration, where the first time occurs prior to the start of an r-TWT SP. In block 1114, the process 1110 proceeds with selectively responding to the RTS frame based on the requested TXOP and a duration between the first time and the start of the r-TWT SP. In some implementations, the selective responding to the RTS frame may include transmitting a CTS frame that allocates the requested TXOP to the first STA based on the requested TXOP being shorter than or equal to the duration between the first time and the start of the r-TWT SP. In some implementations, the wireless communication device may allocate the requested TXOP to the first STA after the start of the r-TWT SP based on the requested TXOP being longer than the duration between the first time and the start of the r-TWT SP.

In some implementations, the selective responding to the RTS frame may include transmitting a CTS frame that allocates, to the first STA, a TXOP shorter than the requested TXOP based on the requested TXOP being longer than the duration between the first time and the start of the r-TWT SP. In some other implementations, the selective responding to the RTS frame may include transmitting a CTS-to-self frame that reserves a TXOP longer than or equal to the requested TXOP based on the requested TXOP being longer than the duration between the first time and the start of the r-TWT SP. Still further, in some implementations, the wireless communication device may not respond to the RTS frame based on the requested TXOP being longer than the duration between the first time and the start of the r-TWT SP.

Figure 12:
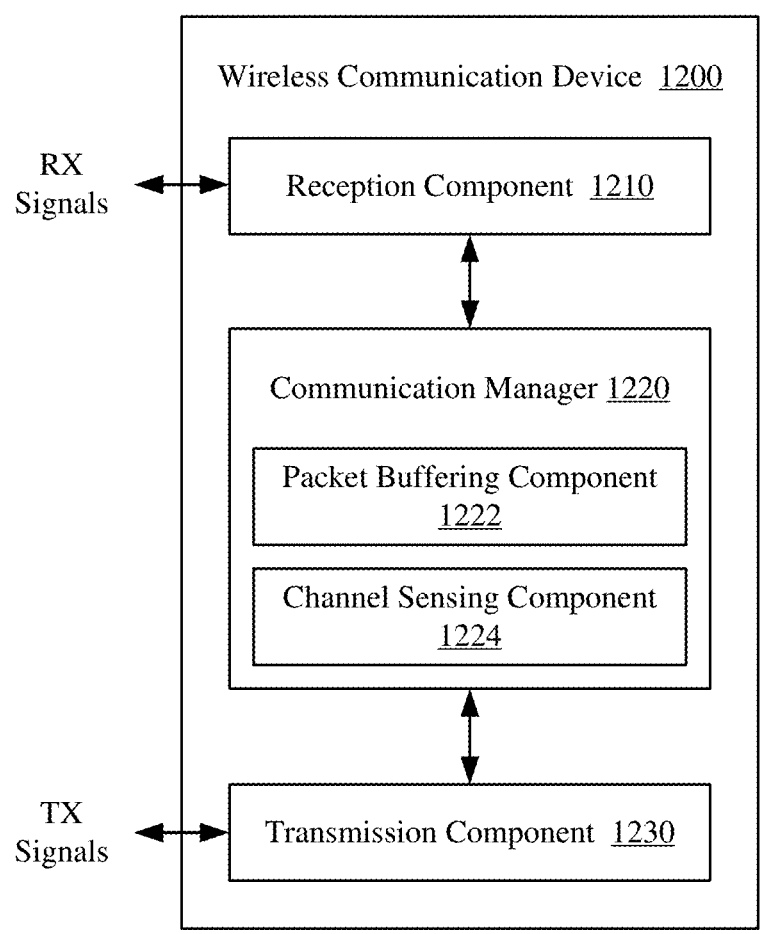
FIG. 12 shows a block diagram of an example wireless communication device according to some implementations.

FIG. 12 shows a block diagram of an example wireless communication device 1200 according to some implementations. In some implementations, the wireless communication device 1200 is configured to perform the process 1000 described above with reference to FIG. 10. The wireless communication device 1200 can be an example implementation of the wireless communication device 400 described above with reference to FIG. 4. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes a packet buffering component 1222 and a channel sensing component 1224. Portions of one or more of the components 1222 and 1224 may be implemented at least in part in hardware or firmware. In some implementations, at least some of the components 1222 or 1224 are implemented at least in part as software stored in a memory (such as the memory 408). For example, portions of one or more of the components 1222 and 1224 can be implemented as non-transitory instructions (or "code") executable by a processor (such as the processor 406) to perform the functions or operations of the respective component.

The reception component 1210 is configured to receive RX signals, over a wireless channel, from one or more other wireless communication devices. The communication manager 1220 is configured to control or manage communications with one or more other wireless communication devices. In some implementations, the packet buffer component 1222 may buffer one or more DL packets based on a timing of a first r-TWT SP; and the channel sensing component 1224 may perform a channel sensing operation that indicates whether a wireless channel associated with the first r-TWT SP is busy or idle. The transmission component 1230 is configured to transmit TX signals, over a wireless channel, to one or more other wireless communication devices. In some implementations, the transmission component 1230 may transmit the buffered DL packets, over the wireless channel, to one or more STAs associated with a BSS based on a duration that the wireless channel is idle between a first time and the start of the first r-TWT SP, where the first time occurs a fixed duration prior to the start of the first r-TWT SP.

Figure 13:
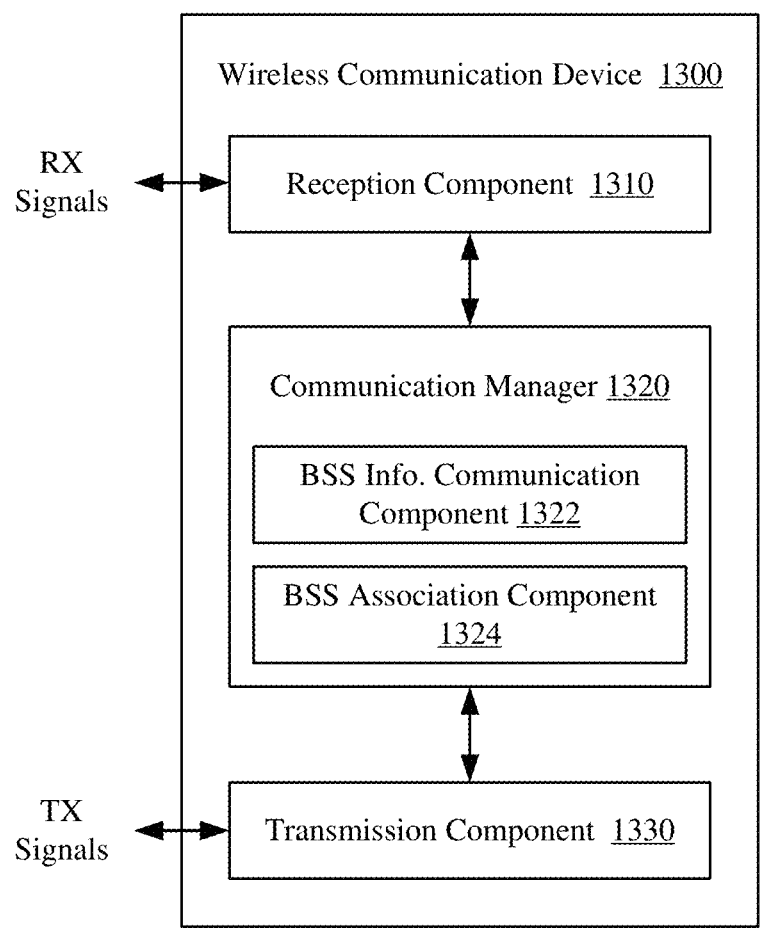
FIG. 13 shows a block diagram of an example wireless communication device according to some implementations.

FIG. 13 shows a block diagram of an example wireless communication device 1300 according to some implementations. In some implementations, the wireless communication device 1300 is configured to perform any of the processes 1100 or 1110 described above with reference to FIGS. 11A and 11B, respectively. The wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes a BBS information communication component 1322 and a BSS association component 1324. Portions of one or more of the components 1322 and 1324 may be implemented at least in part in hardware or firmware. In some implementations, at least some of the components 1322 or 1324 are implemented at least in part as software stored in a memory (such as the memory 408). For example, portions of one or more of the components 1322 and 1324 can be implemented as non-transitory instructions (or "code") executable by a processor (such as the processor 406) to perform the functions or operations of the respective component.

The reception component 1310 is configured to receive RX signals, over a wireless channel, from one or more other wireless communication devices. The communication manager 1320 is configured to control or manage communications with one or more other wireless communication devices. In some implementations, the BSS information communication component 1322 may transmit one or more packets carrying BSS information indicating one or more requirements associated with r-TWT operation in a BSS; and the BSS association component 1324 may associate with one or more STAs based on the BSS information carried in the one or more packets, where the one or more STAs indicate support for the one or more requirements associated with r-TWT operation in the BSS. The transmission component 1330 is configured to transmit TX signals, over a wireless channel, to one or more other wireless communication devices.

Implementation examples are described in the following numbered clauses:

1. A method for wireless communication by a wireless communication device, including:
    buffering one or more downlink (DL) packets based on a timing of a first restricted target wake time (r-TWT) service period (SP);
    performing a channel sensing operation that indicates whether a wireless channel associated with the first r-TWT SP is busy or idle; and
    transmitting the buffered DL packets, over the wireless channel, to one or more first wireless stations (STAs) associated with a basic service set (BSS) based on a duration that the wireless channel is idle between a first time and the start of the first r-TWT SP, the first time occurring a fixed duration prior to the start of the first r-TWT SP.

2. The method of clause 1, where the one or more first STAs are not associated with the first r-TWT SP.

3. The method of any of clauses 1 or 2, where the buffered DL packets span a maximum transmit opportunity (TXOP) duration allowed by the BSS.

4. The method of any of clauses 1-3, where the fixed duration is greater than or equal to a point coordination function (PCF) interframe space (PIFS) duration plus a maximum TXOP duration allowed by the BSS.

5. The method of any of clauses 1-4, where the transmitting of the buffered DL packets includes:
acquiring a TXOP on the wireless channel prior to the start of the first r-TWT SP and responsive to the channel sensing operation indicating that the wireless channel is idle for at least a PIFS duration after the first time, at least one of the buffered DL packets being transmitted during the TXOP.

6. The method of any of clauses 1-5, where the TXOP terminates at the start of the first r-TWT SP.

7. The method of any of clauses 1-4, where the transmitting of the buffered DL packets includes:
acquiring a TXOP on the wireless channel during the first r-TWT SP based on the channel sensing operation indicating that the wireless channel is not idle for at least a PIFS duration between the first time and the start of the first r-TWT SP, at least one of the buffered DL packets being transmitted during the TXOP.

8. The method of any of clauses 1-4 or 7, further including:
communicating, during the first r-TWT SP, with one or more second STAs associated with the first r-TWT SP, the TXOP being acquired during a remainder of the first r-TWT SP following the communications with the one or more second STAs.

9. The method of any of clauses 1-4, 7, or 8, further including:
communicating, during the remainder of the first r-TWT SP, with one or more third STAs that are not associated with the r-TWT SP.

10. The method of any of clauses 1-4, where the transmitting of the buffered DL packets includes:
acquiring a TXOP on the wireless channel after the end of the first r-TWT SP based on the channel sensing operation indicating that the wireless channel is not idle for at least a PIFS duration between the first time and the start of the first r-TWT SP, at least one of the buffered DL packets being transmitted during the TXOP.

11. The method of any of clauses 1-10, further including:
scheduling a second r-TWT SP to follow the first r-TWT SP by less than a threshold duration, the one or more first STAs not being associated with any of the first or second r-TWT SPs.

12. A wireless communication device including:
at least one processor; and
at least one memory communicatively coupled with the at least one processor and storing processor-readable code that, when executed by the at least one processor, is configured to perform the method of any one or more of clauses 1-11.

13. A method for wireless communication performed by a wireless communication device, including:
transmitting one or more packets carrying basic service set (BSS) information indicating one or more requirements associated with restricted target wake time (r-TWT) operation in a BSS; and
associating with one or more wireless stations (STAs) based on the BSS information carried in the one or more packets, the one or more STAs indicating support for the one or more requirements associated with r-TWT operation in the BSS.

14. The method of clause 13, where the BSS information is carried in a non-legacy operation element and indicates that STAs associated with the BSS must support r-TWT operation.

15. The method of clause 13, where the BSS information indicates a maximum transmit opportunity (TXOP) duration allowed by the BSS for STAs that are not associated with an r-TWT service period (SP).

16. The method of any of clauses 13 or 15, where M the BSS information is dynamically updated based on a timing of the r-TWT SP.

17. The method of any of clauses 13, 15, or 16, where the maximum TXOP duration spans a single medium access control (MAC) service data unit (MSDU).

18. The method of clause 13, where the BSS information is carried in a legacy operation element and indicates that STAs associated with the BSS must perform request-to-send (RTS)/clear-to-send (CTS) exchanges to acquire TXOPs that exceed a threshold duration.

19. The method of any of clauses 13 or 18, where the threshold duration is equal to 32 microseconds.

20. The method of any of clauses 13, 18, or 19, further including:
receiving, at a first time, an RTS frame from a first STA requesting a TXOP that exceeds the threshold duration, the first time occurring prior to the start of an r-TWT SP; and
selectively responding to the RTS frame based on the requested TXOP and a duration between the first time and the start of the r-TWT SP.

21. The method of any of clauses 13 or 18-20, where the selective responding to the RTS frame includes:
transmitting a CTS frame that allocates the requested TXOP to the first STA based on the requested TXOP being shorter than or equal to the duration between the first time and the start of the r-TWT SP.

22. The method of any of clauses 13 or 18-20, where the selective responding to the RTS frame includes:
transmitting a CTS frame that allocates, to the first STA, a TXOP shorter than the requested TXOP based on the requested TXOP being longer than the duration between the first time and the start of the r-TWT SP.

23. The method of any of clauses 13 or 18-20, where the selective responding to the RTS frame includes:
transmitting a CTS-to-self frame that reserves a TXOP longer than or equal to the requested TXOP based on the requested TXOP being longer than the duration between the first time and the start of the r-TWT SP.

24. The method of any of clauses 13 or 18-20, where the wireless communication device does not respond to the RTS frame based on the requested TXOP being longer than the duration between the first time and the start of the r-TWT SP.

25. The method of any of clauses 13-24, further including:
allocating the requested TXOP to the first STA after the start of the r-TWT SP based on the requested TXOP being longer than the duration between the first time and the start of the r-TWT SP.

26. A wireless communication device including:
at least one processor; and
at least one memory communicatively coupled with the at least one processor and storing processor-readable code that, when executed by the at least one processor, is configured to perform the method of any one or more of clauses 13-25.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless access point (AP), comprising:
transmitting a first packet carrying basic service set (BSS) information for a BSS managed by the wireless AP, the BSS information indicating that wireless stations (STAs), in order to associate with the wireless AP to join the BSS, must, while thereafter operating in the BSS:
support restricted target wake time (r-TWT) operation in the BSS; or
perform a request-to-send (RTS)/clear-to-send (CTS) exchange when attempting to acquire any TXOP that exceeds a threshold duration;
receiving a second packet from a wireless STA that indicates that the wireless STA will support the r-TWT operation in the BSS or perform an RTS/CTS exchange when attempting to acquire any TXOP that exceeds the threshold duration; and
associating with the wireless STA in accordance with the reception of the second packet indicating that the wireless STA will support the r-TWT operation in the BSS or perform the RTS/CTS exchange when attempting to acquire any TXOP that exceeds the threshold duration.

2. The method of claim 1, wherein the BSS information that indicates that wireless STAs, in order to associate with the wireless AP to join the BSS, must support r-TWT operation while thereafter operating in the BSS is carried in a non-legacy operation element of the first packet.

3. The method of claim 1, wherein the BSS information indicates a maximum transmit opportunity (TXOP) duration allowed by the BSS for STAs that are not associated with an r-TWT service period (SP) associated with other STAs in the BSS.

4. The method of claim 3, wherein the BSS information is dynamically updated based on a timing of the r-TWT SP.

5. The method of claim 3, wherein the maximum TXOP duration spans a single medium access control (MAC) service data unit (MSDU).

6. The method of claim 1, wherein the BSS information that indicates that wireless STAs, in order to associate with the wireless AP to join the BSS, must perform the RTS/CTS exchange when attempting to acquire any TXOP that exceeds the threshold duration is carried in a legacy operation element of the first packet.

7. The method of claim 1, wherein the threshold duration is equal to 32 microseconds.

8. The method of claim 1, further comprising:
receiving, at a first time, an RTS frame from a first STA requesting a TXOP that exceeds the threshold duration, the first time occurring prior to the start of an r-TWT SP; and
selectively responding to the RTS frame based on the requested TXOP and a duration between the first time and the start of the r-TWT SP.

9. The method of claim 8, wherein the selective responding to the RTS frame comprises:
transmitting a CTS frame that allocates the requested TXOP to the first STA based on the requested TXOP being shorter than or equal to the duration between the first time and the start of the r-TWT SP.

10. The method of claim 8, wherein the selective responding to the RTS frame comprises:
transmitting a CTS frame that allocates, to the first STA, a TXOP shorter than the requested TXOP based on the requested TXOP being longer than the duration between the first time and the start of the r-TWT SP.

11. The method of claim 8, wherein the selective responding to the RTS frame comprises:
transmitting a CTS-to-self frame that reserves a TXOP longer than or equal to the requested TXOP based on the requested TXOP being longer than the duration between the first time and the start of the r-TWT SP.

12. The method of claim 8, wherein the wireless AP does not respond to the RTS frame based on the requested TXOP being longer than the duration between the first time and the start of the r-TWT SP.

13. The method of claim 8, further comprising:
allocating the requested TXOP to the first STA after the start of the r-TWT SP based on the requested TXOP being longer than the duration between the first time and the start of the r-TWT SP.

14. A wireless communication device comprising:
at least one processor; and
at least one memory communicatively coupled with the at least one processor and storing processor-readable code that, when executed by the at least one processor, is configured to:
transmit a first packet carrying basic service set (BSS) information for a BSS managed by the wireless communication device, the BSS information indicating that wireless stations (STAs), in order to associate with the wireless communication device to join the BSS, must, while thereafter operating in the BSS:
support restricted target wake time (r-TWT) operation in the BSS; or
perform a request-to-send (RTS)/clear-to-send (CTS) exchange when attempting to acquire any TXOP that exceeds a threshold duration;
receive a second packet from a wireless STA that indicates that the wireless STA will support the r-TWT operation in the BSS or perform an RTS/CTS exchange when attempting to acquire any TXOP that exceeds the threshold duration; and
associate with the wireless STA in accordance with the reception of the second packet indicating that the wireless STA will support the r-TWT operation in the BSS or perform the RTS/CTS exchange when attempting to acquire any TXOP that exceeds the threshold duration.

15. The wireless communication device of claim 14, wherein the BSS information that indicates that wireless STAs, in order to associate with the wireless communication device to join the BSS, must support r-TWT operation while thereafter operating in the BSS is carried in a non-legacy operation element of the first packet.

16. The wireless communication device of claim 14, wherein the BSS information indicates a maximum transmit opportunity (TXOP) duration allowed by the BSS for STAs that are not associated with an r-TWT service period (SP) associated with other STAs in the BSS.

17. The wireless communication device of claim 16, wherein the BSS information is dynamically updated based on a timing of the r-TWT SP.

18. The wireless communication device of claim 16, wherein the maximum TXOP duration spans a single medium access control (MAC) service data unit (MSDU).

19. The wireless communication device of claim 14, wherein the BSS information that indicates that wireless STAs, in order to associate with the wireless communication device to join the BSS, must perform the RTS/CTS exchange when attempting to acquire any TXOP that exceeds the threshold duration is carried in a legacy operation element of the first packet.

20. The wireless communication device of claim 14, wherein the threshold duration is equal to 32 microseconds.

21. The wireless communication device of claim 14, wherein the code, when executed by the at least one processor, is further configured to:
receive, at a first time, an RTS frame from a first STA requesting a TXOP that exceeds the threshold duration, the first time occurring prior to the start of an r-TWT SP; and
selectively respond to the RTS frame based on the requested TXOP and a duration between the first time and the start of the r-TWT SP.

22. The wireless communication device of claim 21, wherein, to selectively respond to the RTS frame, the code, when executed by the at least one processor, is configured to:
transmit a CTS frame that allocates the requested TXOP to the first STA based on the requested TXOP being shorter than or equal to the duration between the first time and the start of the r-TWT SP.

23. The wireless communication device of claim 21, wherein, to selectively respond to the RTS frame, the code, when executed by the at least one processor, is configured to:
transmit a CTS frame that allocates, to the first STA, a TXOP shorter than the requested TXOP based on the requested TXOP being longer than the duration between the first time and the start of the r-TWT SP.

24. The wireless communication device of claim 21, wherein, to selectively respond to the RTS frame, the code, when executed by the at least one processor, is configured to:
transmit a CTS-to-self frame that reserves a TXOP longer than or equal to the requested TXOP based on the requested TXOP being longer than the duration between the first time and the start of the r-TWT SP.

25. The wireless communication device of claim 21, wherein the wireless communication device does not respond to the RTS frame based on the requested TXOP being longer than the duration between the first time and the start of the r-TWT SP.

26. The wireless communication device of claim 21, wherein the code, when executed by the at least one processor, is further configured to:
allocate the requested TXOP to the first STA after the start of the r-TWT SP based on the requested TXOP being longer than the duration between the first time and the start of the r-TWT SP.

* * * * *